(12) United States Patent
Bragg

(10) Patent No.: US 11,360,277 B2
(45) Date of Patent: Jun. 14, 2022

(54) ROTARY CLIP FOR DUPLEX POLARITY CHANGE

(71) Applicant: Leviton Manufacturing Co., Inc., Melville, NY (US)

(72) Inventor: Charles R. Bragg, Bothell, WA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

(21) Appl. No.: 17/170,352

(22) Filed: Feb. 8, 2021

(65) Prior Publication Data

US 2021/0255404 A1 Aug. 19, 2021

Related U.S. Application Data

(62) Division of application No. 16/284,082, filed on Feb. 25, 2019, now Pat. No. 10,935,736.

(51) Int. Cl.
*G02B 6/38* (2006.01)

(52) U.S. Cl.
CPC ......... *G02B 6/3898* (2013.01); *G02B 6/3871* (2013.01)

(58) Field of Classification Search
CPC ............................ G02B 6/3898; G02B 6/3871
See application file for complete search history.

(56) References Cited

U.S. PATENT DOCUMENTS

| 4,611,887 A | 9/1986 | Glover et al. |
| 5,123,071 A | 6/1992 | Mulholland et al. |
| 5,293,581 A | 3/1994 | DiMarco |
| 5,394,497 A | 2/1995 | Erdman et al. |
| 5,528,712 A | 6/1996 | Belenkiy et al. |
| 5,579,425 A | 11/1996 | Lampert et al. |
| 5,727,101 A | 3/1998 | Giebel et al. |

(Continued)

FOREIGN PATENT DOCUMENTS

| CN | 102749682 A | 10/2012 |
| CN | 102749683 A | 10/2012 |

(Continued)

OTHER PUBLICATIONS

International Search Report and Written Opinion received for PCT Application Serial No. PCT/US2016/055876 dated Jan. 25, 2017, 17 pages.

(Continued)

*Primary Examiner* — Sung H Pak
*Assistant Examiner* — Hoang Q Tran
(74) *Attorney, Agent, or Firm* — Amin, Turocy & Watson, LLP

(57) ABSTRACT

A paired simplex fiber optic connector assembly comprises a clip that holds two simplex LC connectors together to yield a duplex connector that can be plugged into a duplex adapter. In some embodiments, the two simplex connectors are held in place by rails formed on both sides of the clip. In other embodiments, a side arm is formed on each side of the clip, the side arm comprising a hub that extends from the clip and a non-circular flange formed on the end of the hub. The flange is configured to engage with channels formed on the sides of the simplex connectors, thereby holding the simplex connectors in place. The simplex connectors are attached to the clip by rotating the connectors about the flange, thereby engaging the channels with the flanges.

20 Claims, 37 Drawing Sheets

(56) References Cited

U.S. PATENT DOCUMENTS

| | | |
|---|---|---|
| 6,250,817 B1 | 6/2001 | Lampert et al. |
| 6,357,934 B1 | 3/2002 | Driscoll et al. |
| 6,409,392 B1 | 6/2002 | Lampert et al. |
| 6,435,732 B1 | 8/2002 | Asao et al. |
| 6,511,230 B1 | 1/2003 | Connelly et al. |
| 6,672,898 B2 | 1/2004 | Kahle et al. |
| 6,744,939 B2 | 6/2004 | Lampert et al. |
| 6,918,704 B2 | 7/2005 | Marrs et al. |
| 7,178,990 B2 | 2/2007 | Caveney et al. |
| 7,189,008 B2 | 3/2007 | Dye |
| 7,325,980 B2 | 2/2008 | Pepe |
| 7,712,970 B1 | 5/2010 | Lee |
| 7,905,665 B2 | 3/2011 | Moriarty et al. |
| 8,070,367 B2 | 12/2011 | Winberg et al. |
| 8,152,385 B2 | 4/2012 | de Jong et al. |
| 8,636,424 B2 | 1/2014 | Kuffel et al. |
| 8,678,669 B2 | 3/2014 | Lee |
| 8,727,638 B2 | 5/2014 | Lee et al. |
| 8,764,308 B2 | 7/2014 | Irwin et al. |
| 8,801,301 B2 | 8/2014 | Bradley et al. |
| 9,063,303 B2 | 6/2015 | Irwin et al. |
| 9,207,410 B2 | 12/2015 | Lee et al. |
| 9,316,803 B2 | 4/2016 | Manes |
| 9,557,495 B2 | 1/2017 | Raven et al. |
| 9,625,658 B1 | 4/2017 | Lin |
| 9,946,035 B2 | 4/2018 | Gustafson et al. |
| 10,139,572 B2 | 11/2018 | Hopper et al. |
| 10,156,683 B2 | 12/2018 | Manes et al. |
| 10,705,300 B2 | 7/2020 | Takano et al. |
| 2007/0047877 A1 | 3/2007 | Pepe |
| 2010/0220961 A1 | 9/2010 | de Jong et al. |
| 2011/0299814 A1 | 12/2011 | Nakagawa |
| 2012/0099822 A1 | 4/2012 | Kuffel et al. |
| 2012/0308183 A1 | 12/2012 | Irwin et al. |
| 2013/0163934 A1 | 6/2013 | Lee et al. |
| 2014/0050443 A1 | 2/2014 | Lee |
| 2014/0141641 A1 | 5/2014 | De Dios Martin et al. |
| 2014/0169727 A1 | 6/2014 | Veatch et al. |
| 2014/0270636 A1 | 9/2014 | Manes |
| 2015/0277059 A1 | 10/2015 | Raven et al. |
| 2016/0259135 A1 | 9/2016 | Gniadek et al. |
| 2016/0349458 A1 | 12/2016 | Murray et al. |
| 2017/0205591 A1 | 7/2017 | Takano et al. |
| 2017/0293088 A1* | 10/2017 | Manes ................ G02B 6/3878 |
| 2017/0357060 A1 | 12/2017 | Jones |
| 2018/0088288 A1 | 3/2018 | Taira et al. |

FOREIGN PATENT DOCUMENTS

| | | |
|---|---|---|
| CN | 103091793 A | 5/2013 |
| CN | 102749683 B | 11/2014 |
| CN | 102749682 B | 5/2015 |
| TW | M474924 U | 3/2014 |
| WO | 2010/099141 A1 | 9/2010 |
| WO | 2015/103783 A1 | 7/2015 |

OTHER PUBLICATIONS

International Search Report and Written Opinion received for PCT Application Serial No. PCT/US2017/020150 dated Jun. 15, 2017, 11 pages.

International Search Report and Written Opinion received for PCT Application Serial No. PCT/US2017/026486 dated Jul. 26, 2017, 8 pages.

Non-Final Office Action received for U.S. Appl. No. 15/260,305 dated Jun. 30, 2017, 23 pages.

Non-Final Office Action received for U.S. Appl. No. 15/481,039 dated Oct. 5, 2017, 78 pages.

Non-Final Office Action received for U.S. Appl. No. 15/381,071 dated Dec. 29, 2017, 31 pages.

Extended European Search Report received for European Patent Application No. 16898857.4 dated Oct. 10, 2019, 4 pages.

Communication pursuant to Article 94(3) EPC received for EP Patent Application Serial No. 16898857.4 dated Oct. 21, 2019, 9 page.

Communication pursuant to Article 94(3) EPC received for EP Patent Application Serial No. 16898857.4 dated Aug. 3, 2020, 05 pages.

Non-Final Office Action received for U.S. Appl. No. 16/284,082 dated Mar. 13, 2020, 35 pages.

Non-Final Office Action received for U.S. Appl. No. 16/284,082 dated Apr. 9, 2020, 16 pages.

Non-Final Office Action received for U.S. Appl. No. 16/284,082 dated Aug. 21, 2020, 23 pages.

Communication pursuant to Article 94(3) EPC received for EP Patent Application Serial No. 16898857.4 dated Mar. 3, 2022, 5 pages.

* cited by examiner

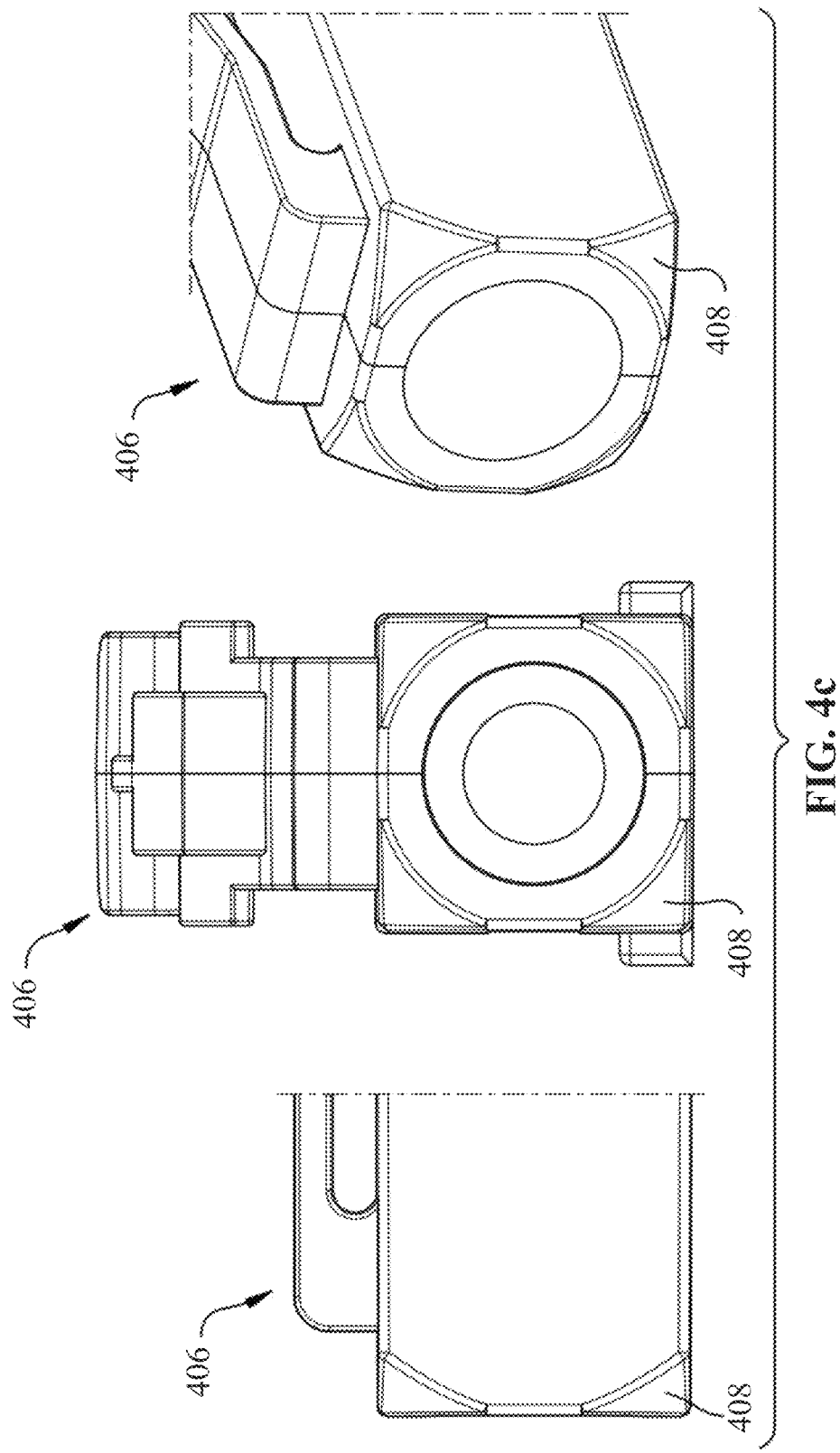

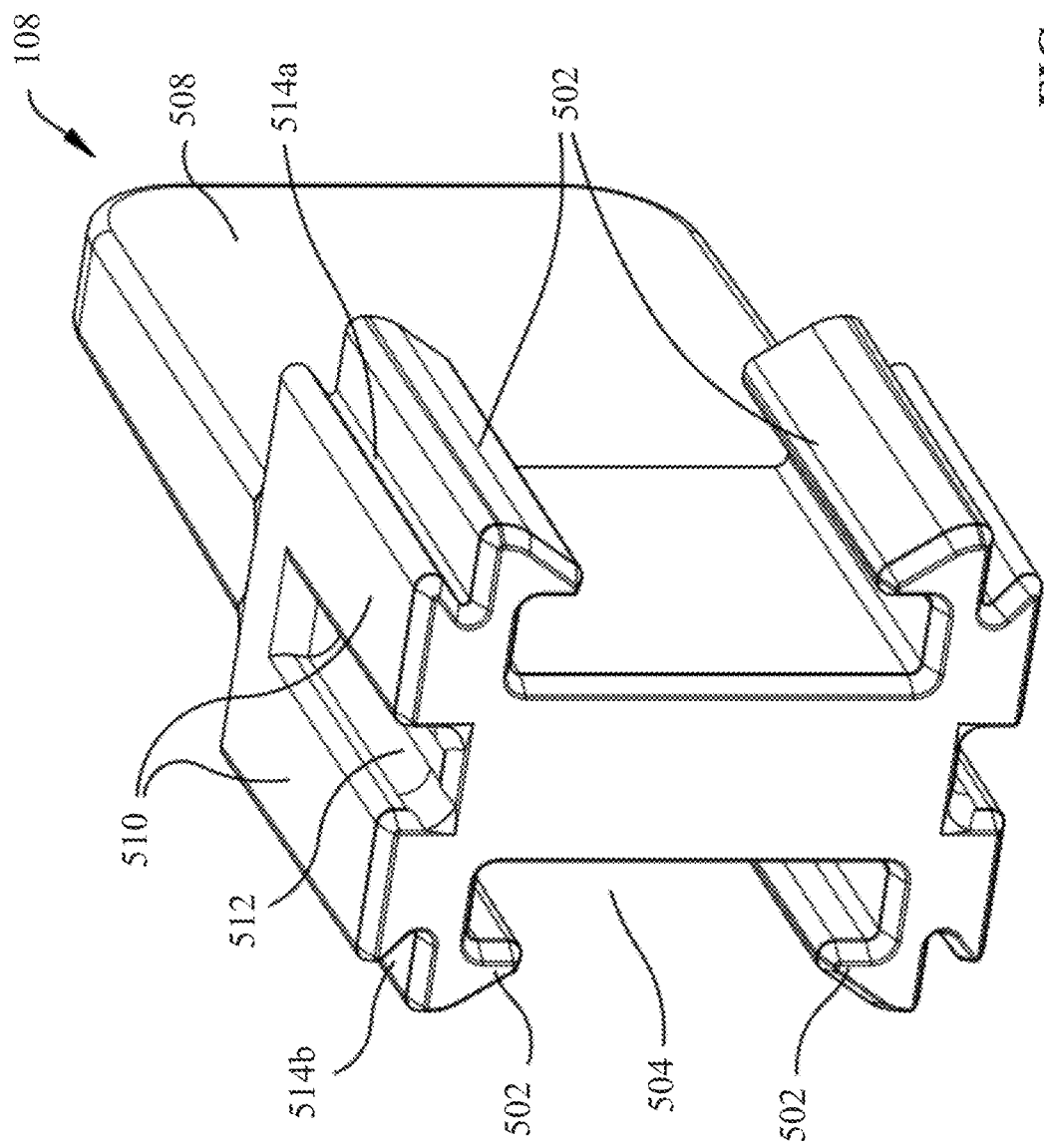

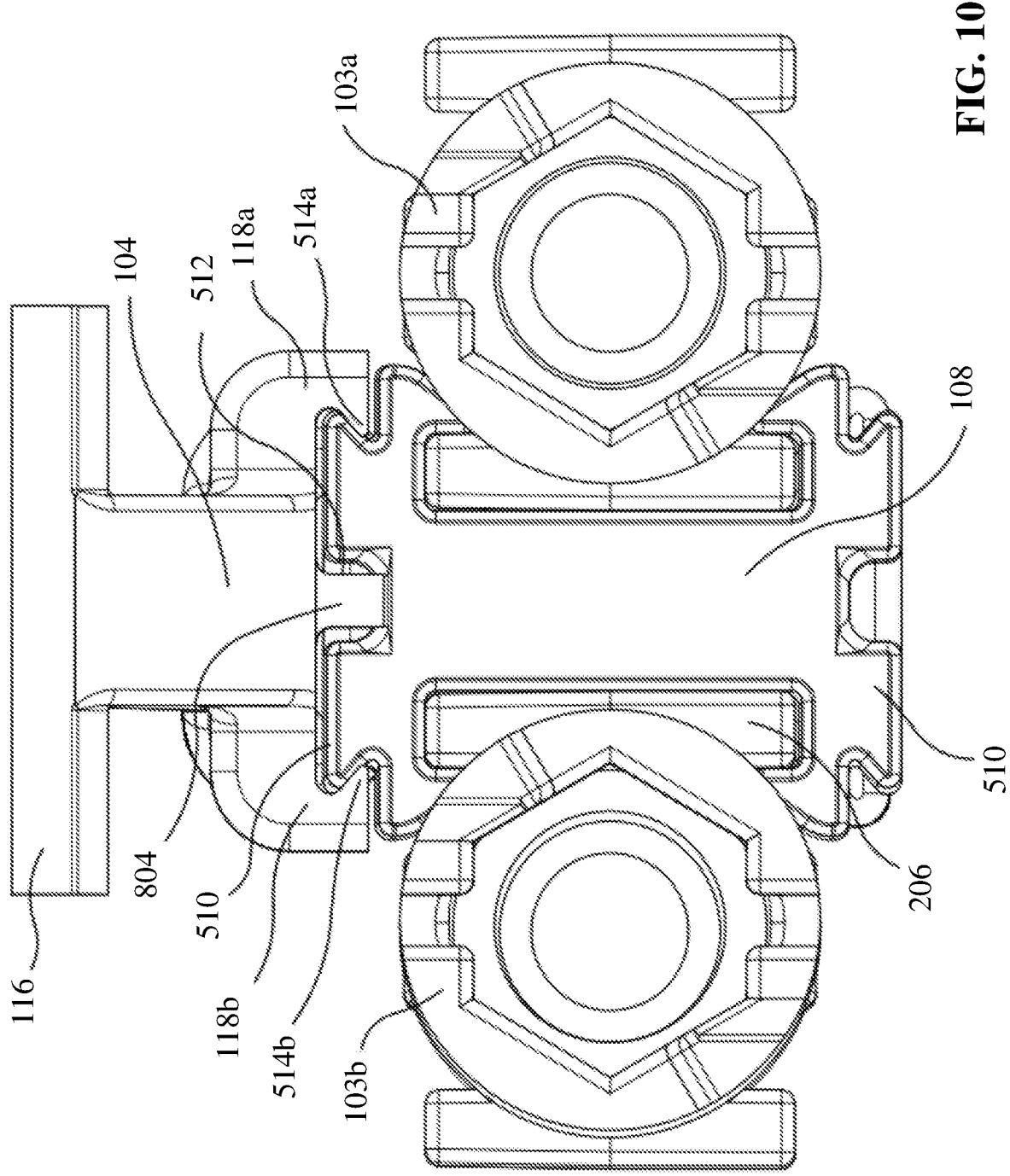

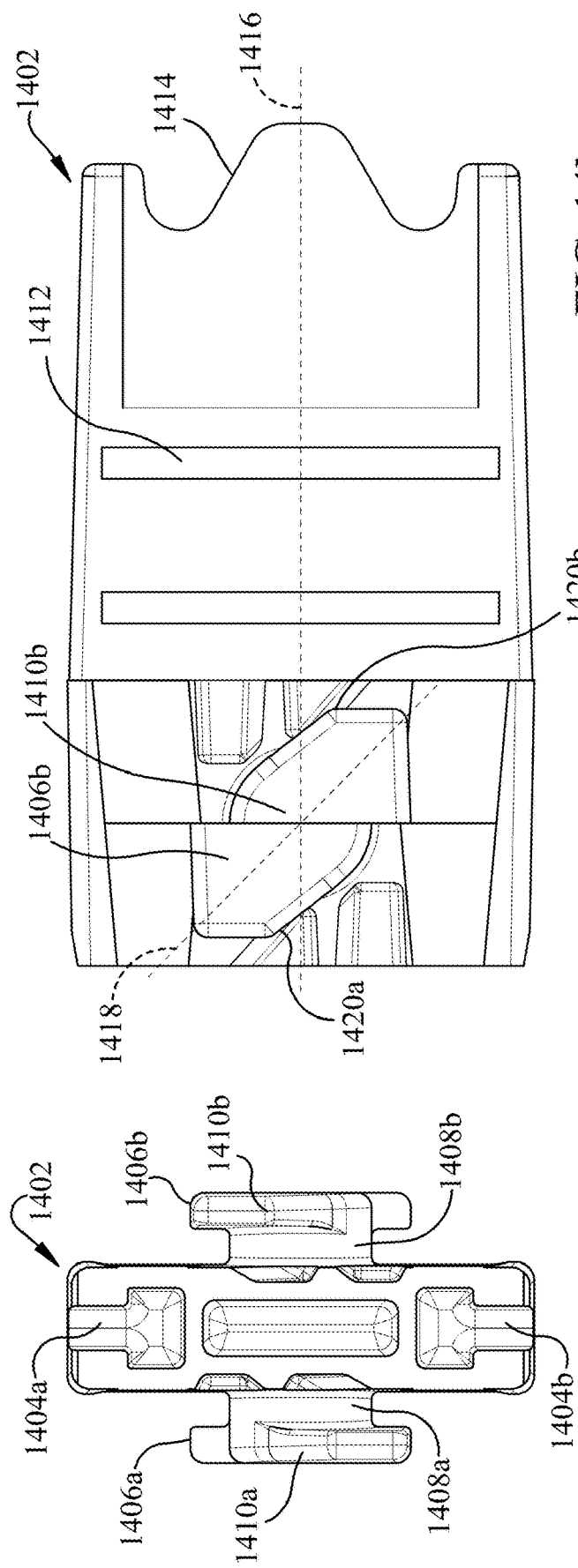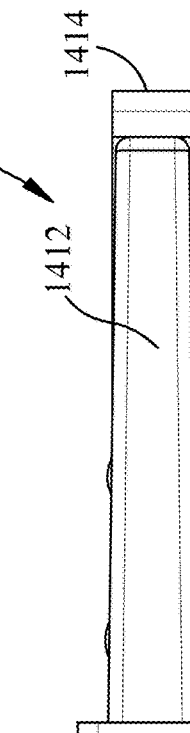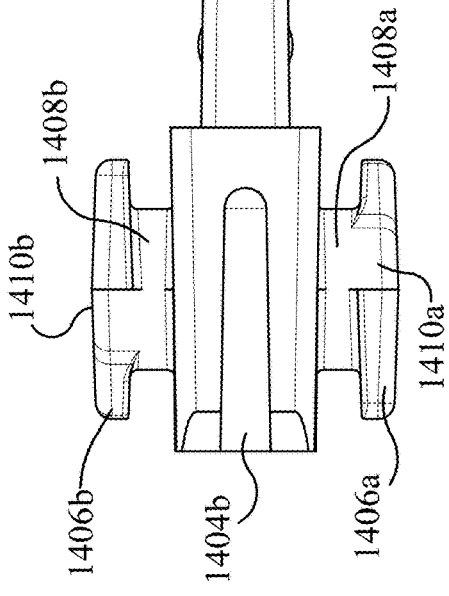

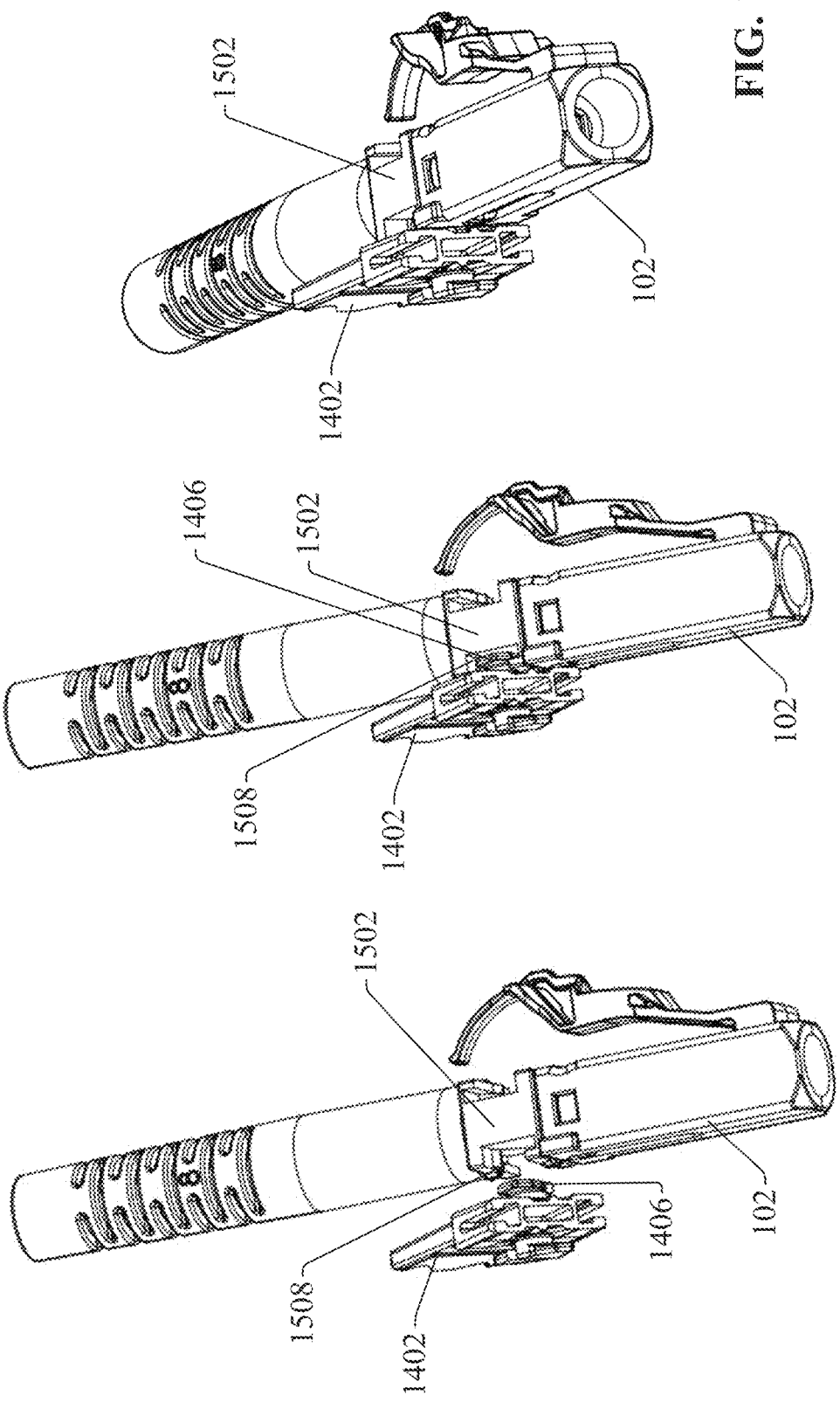

Section A-A

ROTARY CLIP FOR DUPLEX POLARITY CHANGE

RELATED APPLICATION

The subject patent application is a divisional of, and claims priority to, U.S. patent application Ser. No. 16/284,082, filed Feb. 25, 2019, and entitled "ROTARY CLIP FOR DUPLEX POLARITY CHANGE," the entirety of which application is hereby incorporated by reference herein.

TECHNICAL FIELD

The disclosed subject matter relates generally to data cabling, and, in particular, to fiber optic connectors.

BACKGROUND

Many fiber optic systems employ LC fiber optic connectors for termination and connectivity of fiber optic cables. The small form factor of these LC connectors allows a large number of fiber optic cables to be connected in high density arrays, such as those found in fiber optic patch panels used in data centers. Duplexed LC connectors house two optical fibers, each of which is terminated on a respective ferrule that protrude from the front of the duplexed connectors, thereby providing termination and connectivity for a transmit fiber and a receive fiber.

The small form factor of the LC connector—whether used as a single connector ("simplex") or as a duplexed pair—affords a number of advantages, particularly in high density environments. There are, however, a number of functional and perceptual issues inherent in conventional LC connector designs.

For example, when used in congested environments such as fiber optic patch panels, the small spacing between adjacent LC connectors makes it difficult to both insert the LC connector into, and disconnect the connector from, its corresponding port in an adapter or module disposed in a patch panel.

Also, reversing the polarity of patch cables pre-terminated to duplexed LC connectors in the field can be a cumbersome task, requiring the duplexed LC connector assembly to be disassembled and the terminated ferrules within the assembly to be physically swapped before reassembling the assembly. In addition to requiring mechanical disassembly and reassembly of the duplexed LC connector assembly, polarity reversal of duplexed LC connectors creates a risk of tangling or twisting the optical fibers when the ferrules are swapped, potentially damaging the fibers. Moreover, the small form factor, coupled with the relatively large number of interconnected components that often make up these duplexed LC connectors, gives rise to a perception that these connectors lack sufficient rigidity and durability to withstand repeated connection to, and disconnection from, patch panels or other devices.

The above-described deficiencies of current LC connectors are merely intended to provide an overview of some of the problems of current technology and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments described herein relate to improved paired simplex fiber optic connector designs that provide a number of advantages over conventional LC connector designs. Embodiments of the paired simplex connector described herein incorporate features that facilitate easy access to selected fiber cable connectors within high density environments, while maintaining a form factor having a low profile conducive to such high density applications. The connector assemblies described herein employ a relatively small number of component parts, yielding a rigid and reliable construction while lowering manufacturing costs relative to connector designs requiring a larger number of components. The simplex connectors used in the paired simplex assembly incorporate structural features that facilitate fast and easy polarity reversal with little or no risk of twisting or damaging optical fibers in the process. A long-tail puller component can also be added to the connector assembly to provide ready access to the connector within congested installations. The connector maintains a low profile that reduces the risk of catching on adjacent cables or enclosure edges when pulled through congested fiber paths.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

BRIEF DESCRIPTION OF DRAWINGS

FIG. 4c is a set of side, front, and perspective views of an example front body having chamfered or rounded corners on its front face.

FIG. 5 is a perspective view of an example duplex clip.

FIG. 10 is a front view of the paired simplex LC connector assembly including a puller, with the front bodies removed for clarity.

FIG. 14a is a front view of an example clip that supports rotational mounting of the front bodies to yield a paired simplex LC connector assembly.

FIG. 14b is a side view of the example clip that supports rotational mounting of the front bodies to yield a paired simplex LC connector assembly.

FIG. 14c is a bottom view of the example clip that supports rotational mounting of the front bodies to yield a paired simplex LC connector assembly.

FIGS. 18a-18c are perspective views illustrating a sequence for engaging a simple connector to a clip using a rotational action.

DETAILED DESCRIPTION

Figure 1:
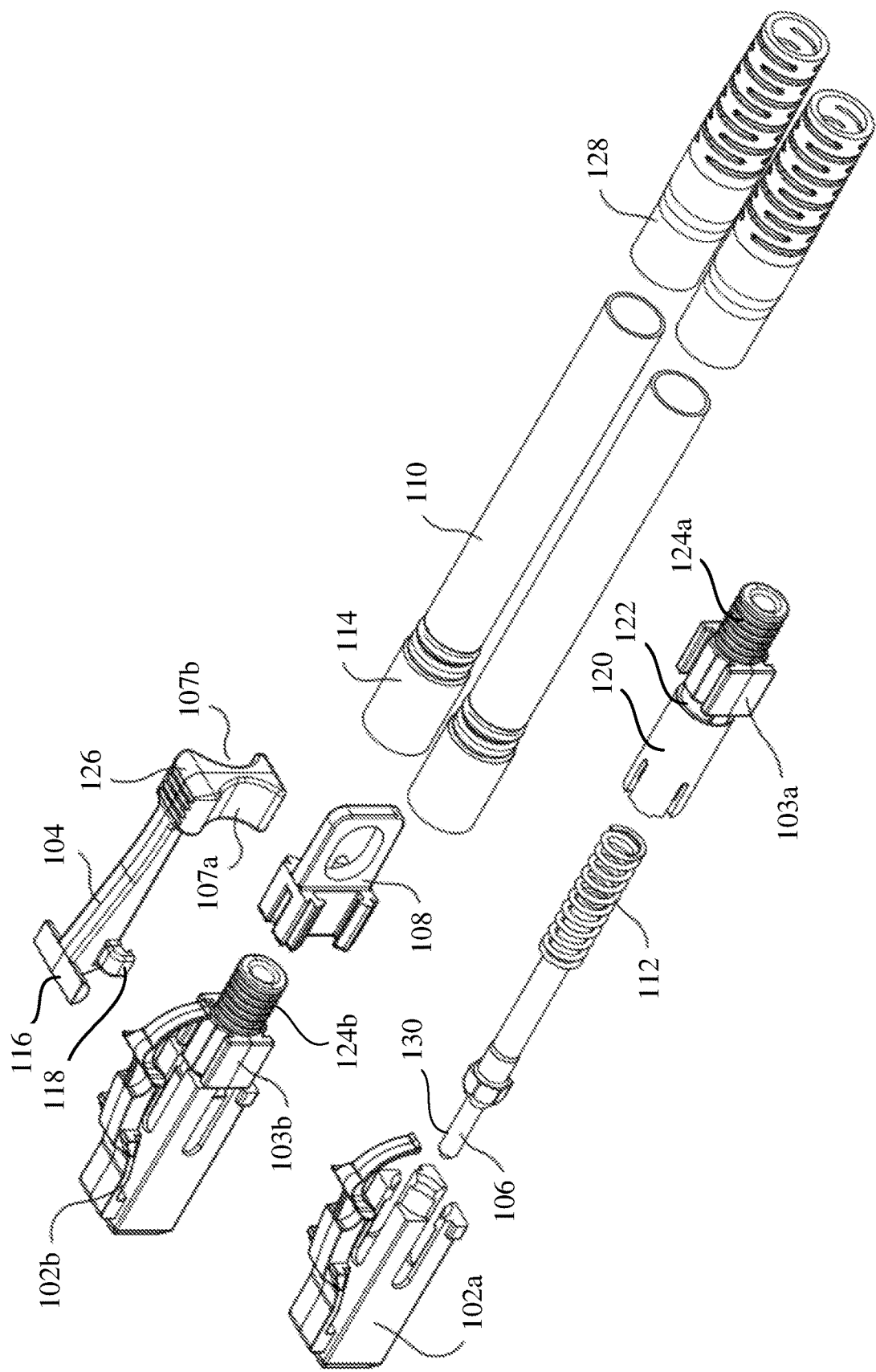
FIG. 1 is an exploded perspective view of the components of an example paired simplex fiber optic connector.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The example fiber optic connector assemblies described herein comprise paired simplex connectors, whereby single LC connectors (also referred to as simplex connectors) are duplexed by means of a clip or attachment mechanism, with each LC connector terminated to a simplex fiber optic cable—each carrying a single optical fiber—to form an LC connector assembly. FIG. 1 is an exploded perspective view of the components of an example paired simplex fiber optic connector according to one or more embodiments of this disclosure. The components of the paired simplex LC connector assembly are separated in FIG. 1 to provide a view of the individual components and their relationships to one another.

The paired simplex connector assembly includes two rear bodies 103a and 103b and two corresponding front bodies 102a and 102b. In FIG. 1, rear body 103b is depicted as being connected to its corresponding front body 102b, while rear body 103a is depicted as being separated from its corresponding front body 102a to provide a view of the ferrule assembly 106 and spring 112 that reside inside the front body/rear body assembly.

Figure 2:
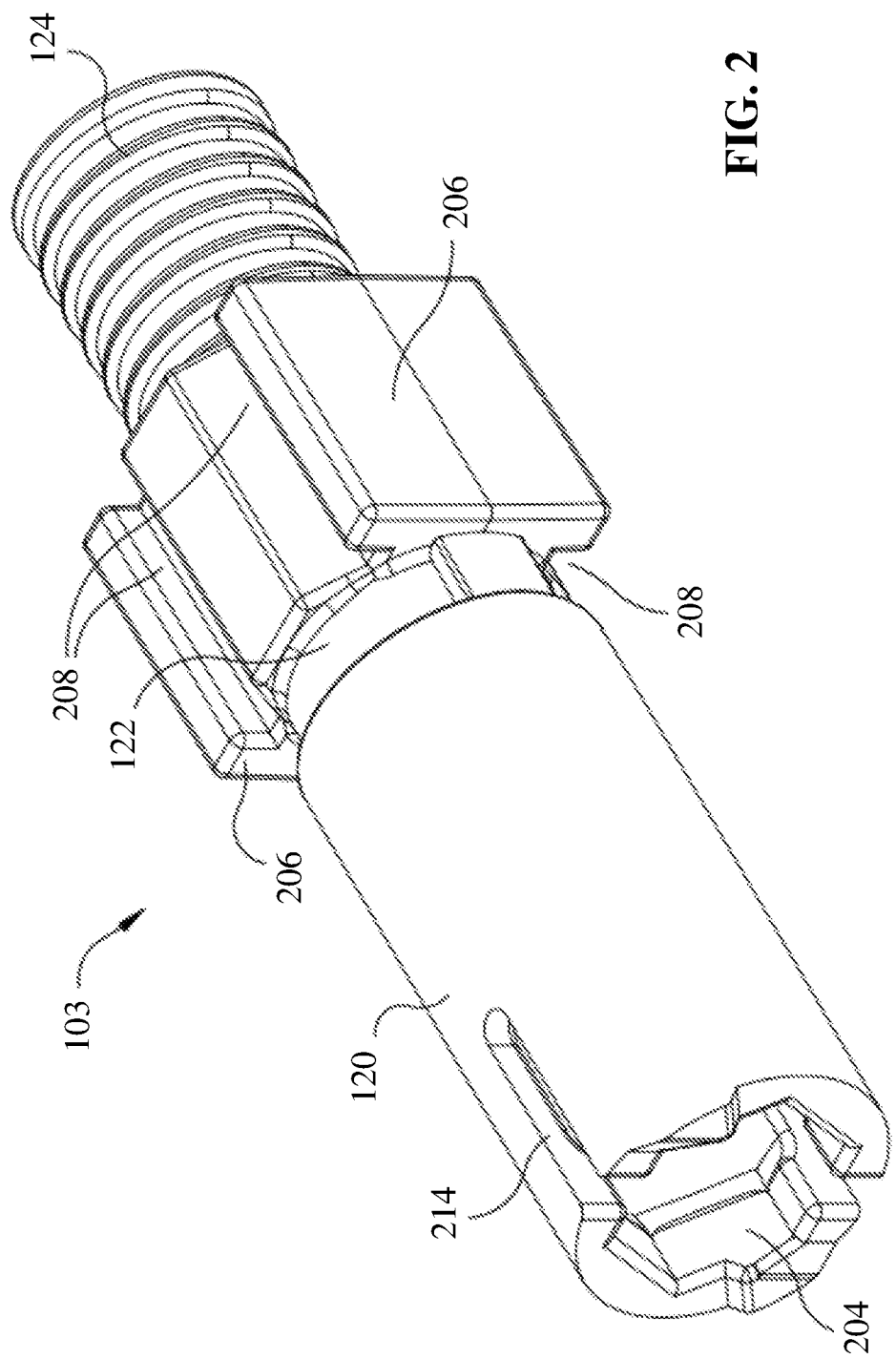
FIG. 2 is a perspective view of an example rear body.

FIG. 2 is a perspective view of a rear body 103. Rear body 103 comprises a barrel projection 120 that is hollow throughout its length and includes a front opening 204 having a hexagonal profile designed to mate with the hexagonal shape of the ferrule holder of ferrule assembly 106 (although other geometric profiles for the front opening 204 are also within the scope of one or more embodiments of this disclosure). Barrel projection 120 also includes two or more cuts 214 that extend from the front opening 204 to a point part way down the length of the barrel projection to facilitate expansion while the ferrule assembly 106 (see FIG. 1) is being inserted. A step or groove 122 is formed at the base of barrel projection 120, and either fully or partially traverses the circumference of the barrel projection 102. The groove 122 is configured to receive raised ridges along the rim of the rear opening of the front body 102 (see FIG. 1), as will be described below.

A crimp core 124 is located on the rear side of rear body 103 and, as shown in FIG. 1, is designed to mate with a crimp sleeve 114 that, together with heat shrink tubing 110 and boot 128, connect a simplex optical cable to the rear body 103. Although FIG. 1 depicts crimp sleeve 114, heat shrink tubing 110, and boot 128 as the means for affixing an optical cable to the rear body 103, it is to be appreciated that other means for attaching the cable to the rear body 103 are within the scope of one or more embodiments of this disclosure.

Figure 3:
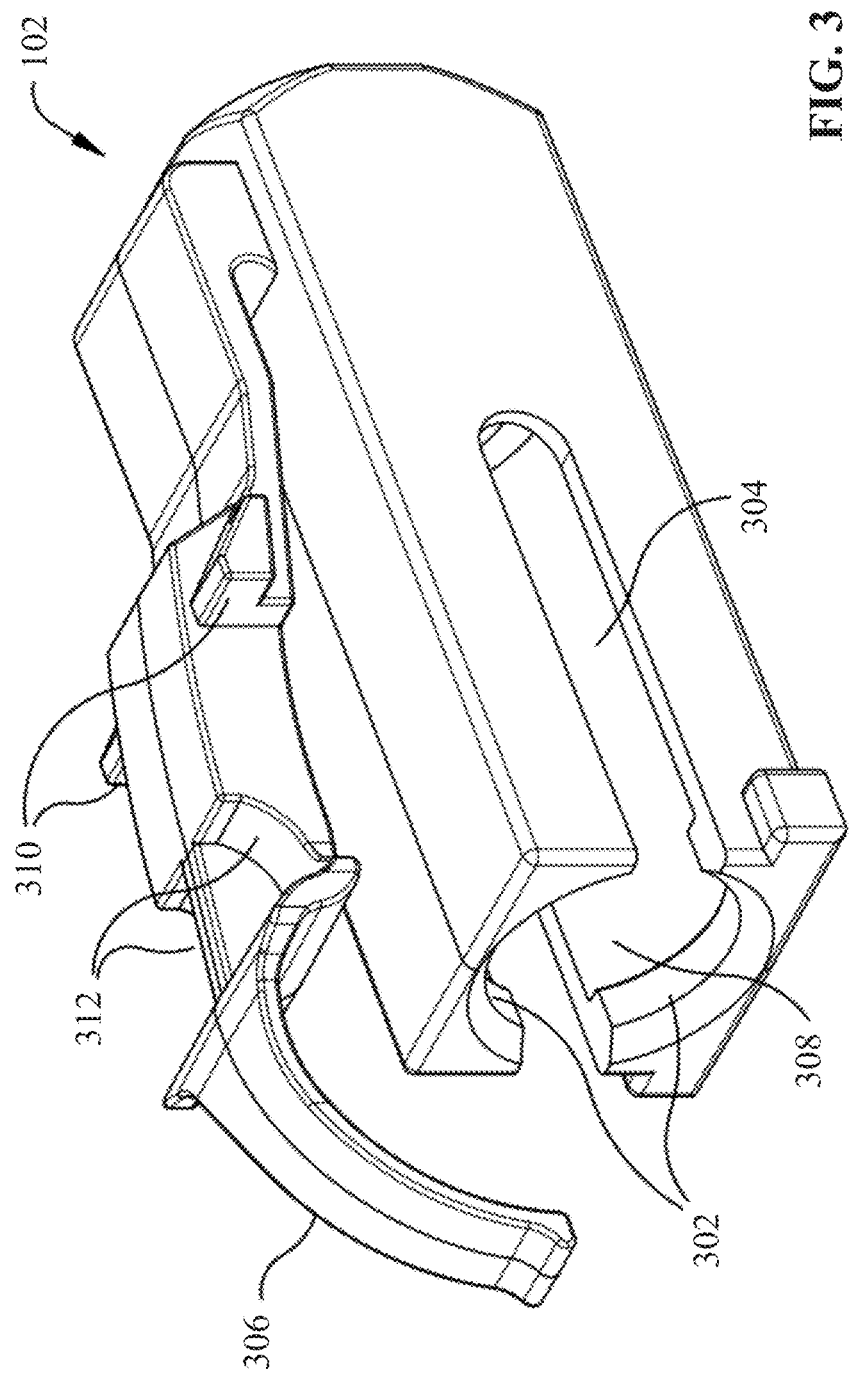
FIG. 3 is a perspective view of an example front body.

FIG. 3 is a perspective view of an example front body 102. Front body 102 mounts over barrel projection 120 of rear body 103 (see FIG. 2) by sliding the rear of the front body 102 over the front of the barrel projection 120 such that the front of the barrel projection 120 enters the rear opening 308 of front body 102. Cuts 304 are formed on the front body 102, traversing from the rear edge of the front body to a point along the length of the front body 102. These cuts 304 afford a degree of expandability when installing the front body 102 over the barrel projection 120. The example illustrated in FIG. 3 depicts only two cuts 304 on opposite left and right sides of the front body 102, thereby splitting the rear opening 308 into two sections. However, some embodiments may also include only one cut, or may include third and fourth cuts 304 on the top and bottom sides of the front body 102, yielding a design having more than two sections or fewer than two sections.

The inner rim of each section of rear opening 308 comprises a raised ridge 302 designed to reside in groove 122 of the barrel projection 120 of rear body 103 (see FIG. 2). Thus, when the front body 102 is fully installed on the barrel projection 120, the raised ridges 302 latch into groove 122 of the barrel projection 120, holding the front body 102 in place on the rear body 103. As will be described in more detail below, the interaction of these raised ridges 302 with groove 122 also facilitates rotation of the front body 102 about the barrel projection 120.

Front body 102 also includes an elastic latch 306 on its top surface that serves to latch the paired simplex connector within an adapter when plugged into a patch panel or other device (not shown). When the connector is mated with an adapter, the upward spring force of the cantilevered latch 306 causes latching surfaces 310 on the latch 306 to remain engaged with corresponding latching features on the adapter (not shown). Applying a downward pressure on the latch 306 causes the latching surfaces 310 to disengage from the latching features of the adapter, thereby allowing the connector to be removed. Latch 306 also includes two recessed areas 312 within which the t-bar 116 of long-tail puller 104 (see FIG. 1) resides when the puller 104 is added to the paired simplex connector assembly (as shown in FIG. 7*b*).

As will be described in more detail below, the interaction of the front body 102 and the rear body 103 allows the front body 102 to rotate about the barrel projection 120 independently of the ferrule assembly 106 (that is, without causing a corresponding rotation of the ferrule assembly 106), which allows the polarity of the connector assembly to be easily reversed in the field. Since this polarity reversal feature is implemented in a connector design having a compact form factor, a puller 104 can also be mounted to the connector without expanding the connector assembly's size profile to a degree that interferes with adjacent connectors in high density connector installations.

Figure 4A:
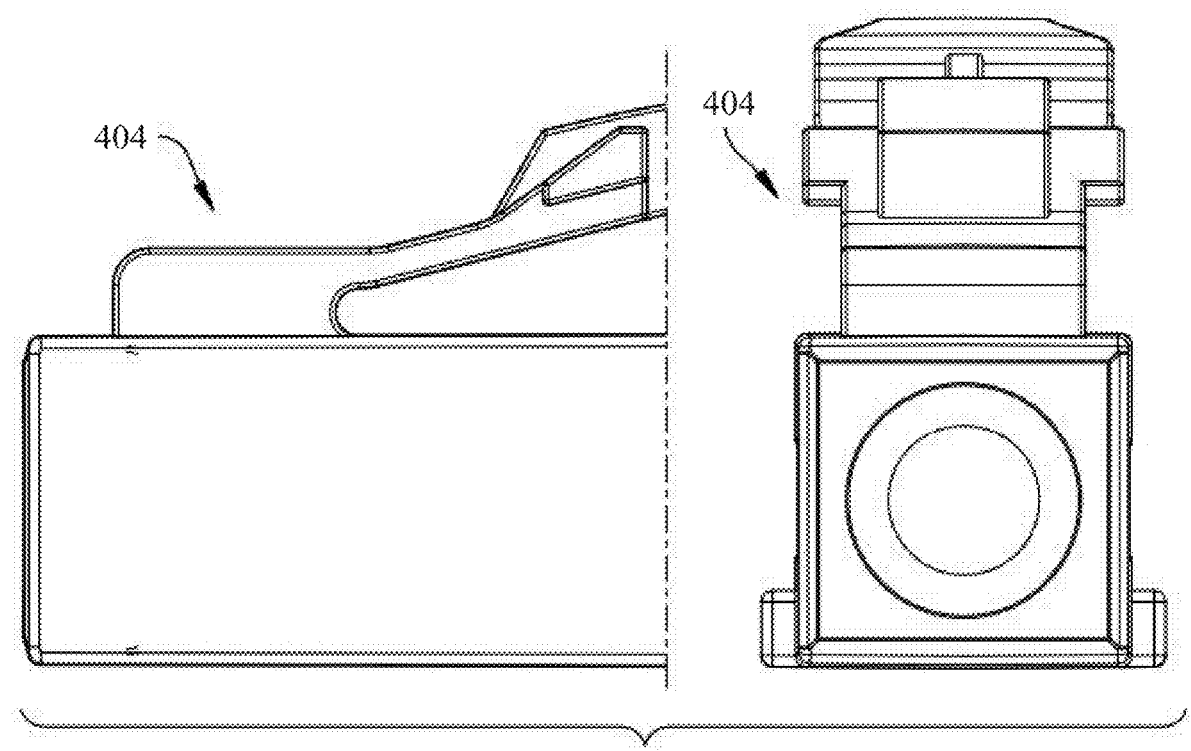
FIG. 4a is a side view and a front view of an example front body having a substantially square profile.
Figure 4B:
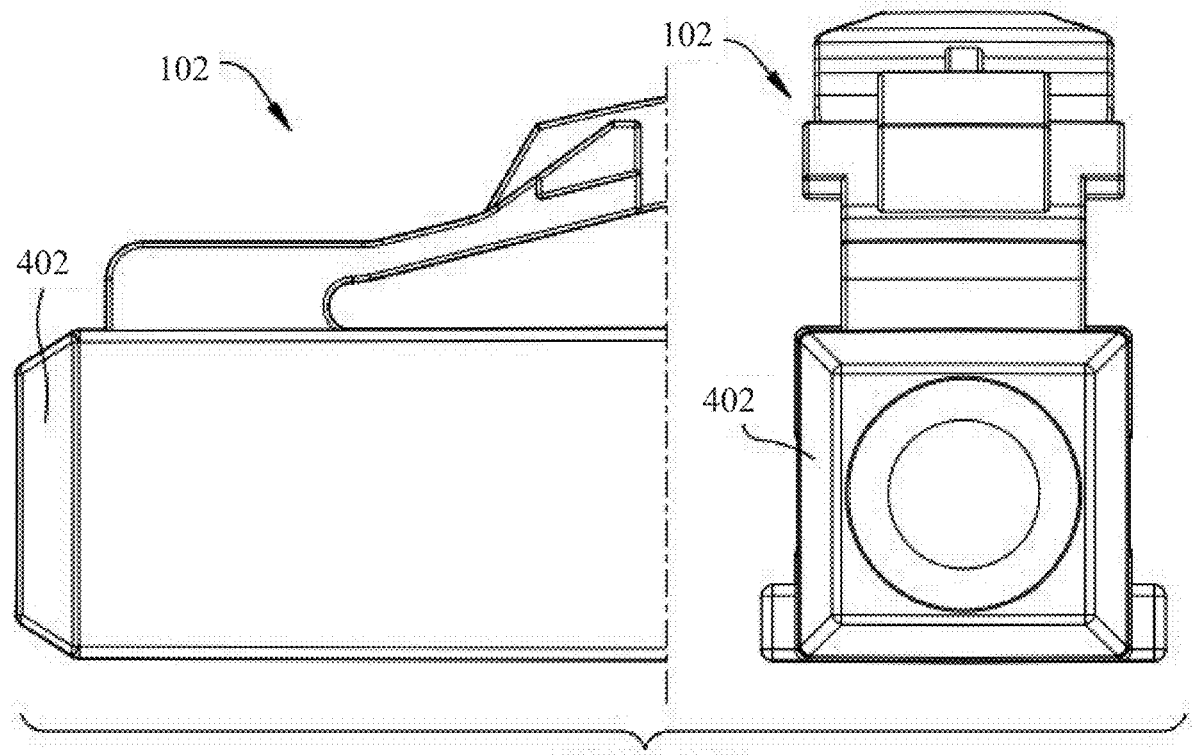
FIG. 4b is a side view and a front view of an example front body having a chamfered front face.

One or more embodiments of the front body 102 can include a number of other features that improve user experience. For example, the front edges of front body 102 can be chamfered to promote ease of insertion into a data port. For comparison, FIG. 4*a* depicts a side view and a front view of a front body 404 having a substantially square profile. FIG. 4*b* depicts a side view and a front view of an example front body 102 having a chamfered front face according to one or more embodiments of the present disclosure. As can be seen, the four edges of the front face are chamfered, resulting in angled surfaces 402 around the front opening of front body 102, in contrast to the squared edges of front body 404. This design affords the user a greater degree of alignment tolerance when inserting the connector into a square fiber optic adapter port, since the angled surfaces 402 allow room for error when aligning the front of the connector with the entrance of the adapter. This feature can be particularly useful when the user is attempting to plug the connector into a fiber optic adapter located outside the user's field of view (e.g., an adapter located in the rear of a panel facing a wall, or that is obscured by other equipment), requiring the user to align the connector with the adapter purely by touch and with no visual guidance.

FIG. 4*c* depicts side, front, and perspective views of another example front body 406 having chamfered or rounded corners 408 on its front face. These chamfered corners 408 serve a similar function to the angled surfaces 402 of front body 102 using an alternative design that produces a more rounded front face.

Returning now to FIG. 1, spring 112 and ferrule assembly 106 are inserted into the barrel projection 120 of rear body 103 via front opening 204 (see FIG. 2). The optical fiber of a simplex cable (not shown) attached to the crimp core 124 enters the rear body 103 and is attached to the rear connection point of ferrule assembly 106, thereby establishing a communicative connection between the optical fiber of the simplex cable and the ferrule assembly. With the ferrule assembly 106 and spring 112 installed in the rear body 103, front body 102 is slid over the barrel projection 120 of rear body 103. The raised ridges 302 along the rim of the front body's rear opening 308 (see FIG. 3) latch into the groove 122 (see FIG. 2) at the base of barrel projection 120. This latching of the ridges 302 in the groove 122 serves both to hold the front body 102 in place on the rear body 103, and to allow the front body to be rotated about the rear body when polarity reversal is desired, as will be described in more detail below. When the front body 102 is fully installed on the barrel projection 120, the front tip 130 of the ferrule protrudes through the front opening of the front body 102, while the rest of the ferrule assembly 106 and the spring 112 are housed within the chamber formed by the barrel projection 120 and the front body 102.

The resulting assembly—comprising a front body 102, a rear body 103, ferrule assembly 106, and spring 112, shown in assembled and exploded views in FIG. 1—yields a simplex LC connector suitable for single conductor connections. In order to pair two simplex cables in a common duplexed connector assembly that can be plugged into a duplex fiber optic adapter (e.g., for patching applications in which two simplex cables act as a send/receive pair of a fiber optic circuit), duplex clip 108 (see FIGS. 1, 5) can be used to join two rear bodies 103 together in a rigid duplex arrangement, and two front bodies 102 can be mounted on the respective two rear bodies 103. FIG. 5 is a perspective view of an example duplex clip 108 according to one or more embodiments. Duplex clip 108 comprises an elongated plate 508, with each of the left and right sides of the plate 508 having a pair of opposing rails 502 located along the top and bottom edges of the plate 508. The rails 502 begin at the front edge of the plate 508 and extend part way along the top and bottom edges toward the rear edge of the plate 508. The two rails on a given side of the plate 508 are spaced away from the plate and oriented such that the two rails face each other. That is, the rails along the top edge face downward, while the rails along the bottom face upward.

Figure 6:
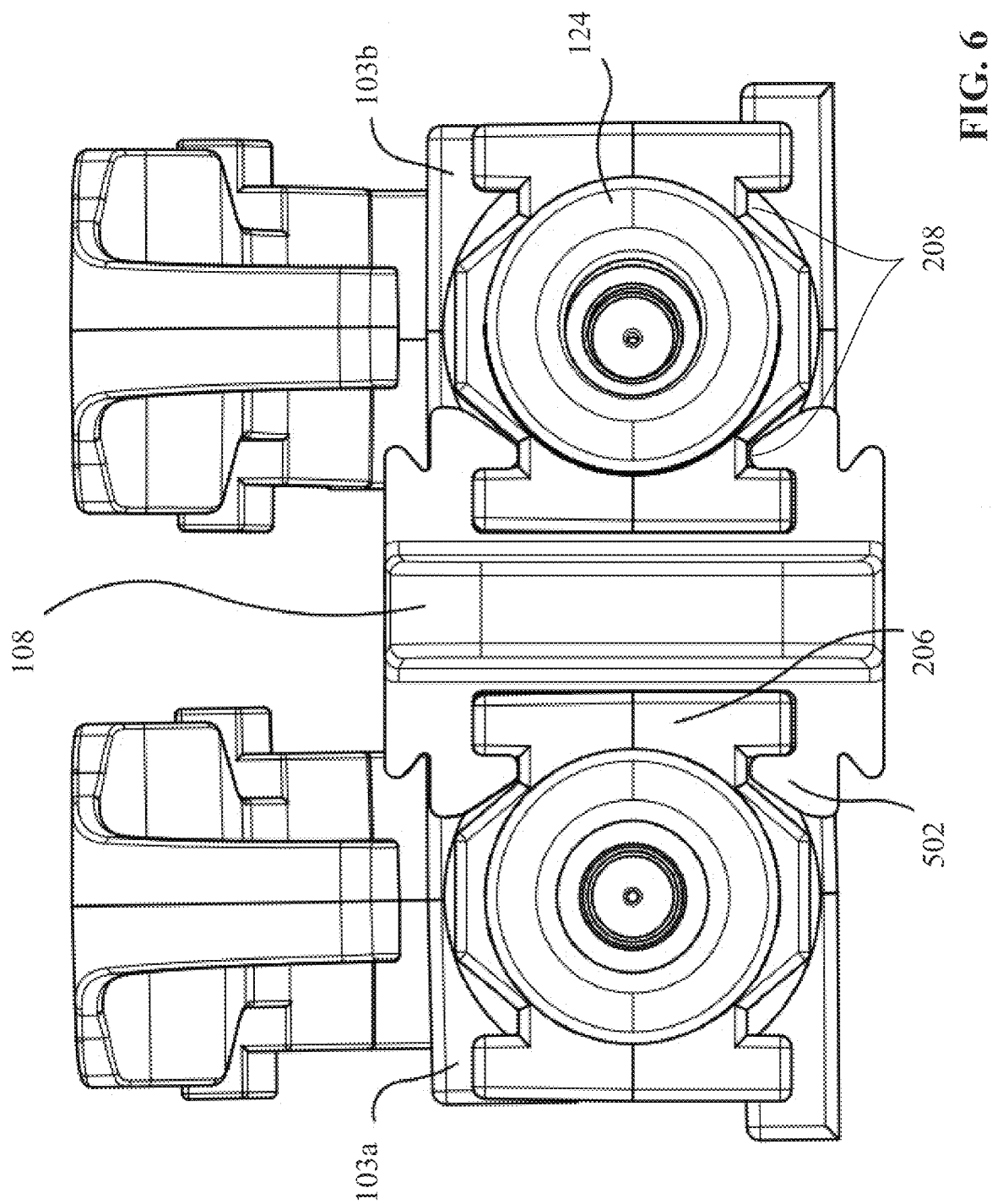
FIG. 6 is a rear view of two rear bodies being held together by a duplex clip.

The spacing of the rails 502 from the plate 508 is set to correspond to a thickness of two side plates 206 located on the left and right sides of the rear body 103 (see FIG. 2). As shown in FIG. 2, grooves 208 are defined behind the top and bottom edges of the side plates 206. The rails 502 of duplex clip 108 are designed to slide into these grooves 208 of side plates 206 from the rear side of rear body 103. When installed in this manner, the side plates 206 of rear body 103 reside within the spaces 504 defined by the top and bottom rails 502 of duplex clip 108. FIG. 6 is a rear view of two rear bodies 103*a* and 103*b* being held together by duplex clip 108. As can be seen in FIG. 6, rails 502 of duplex clip 108 reside in the grooves 208 behind the top and bottom edges of the side plates 206 of the rear bodies 103*a* and 103*b*, effectively holding the two rear bodies 103*a* and 103*b* firmly in place by clasping their inner surfaces.

Figure 7A:
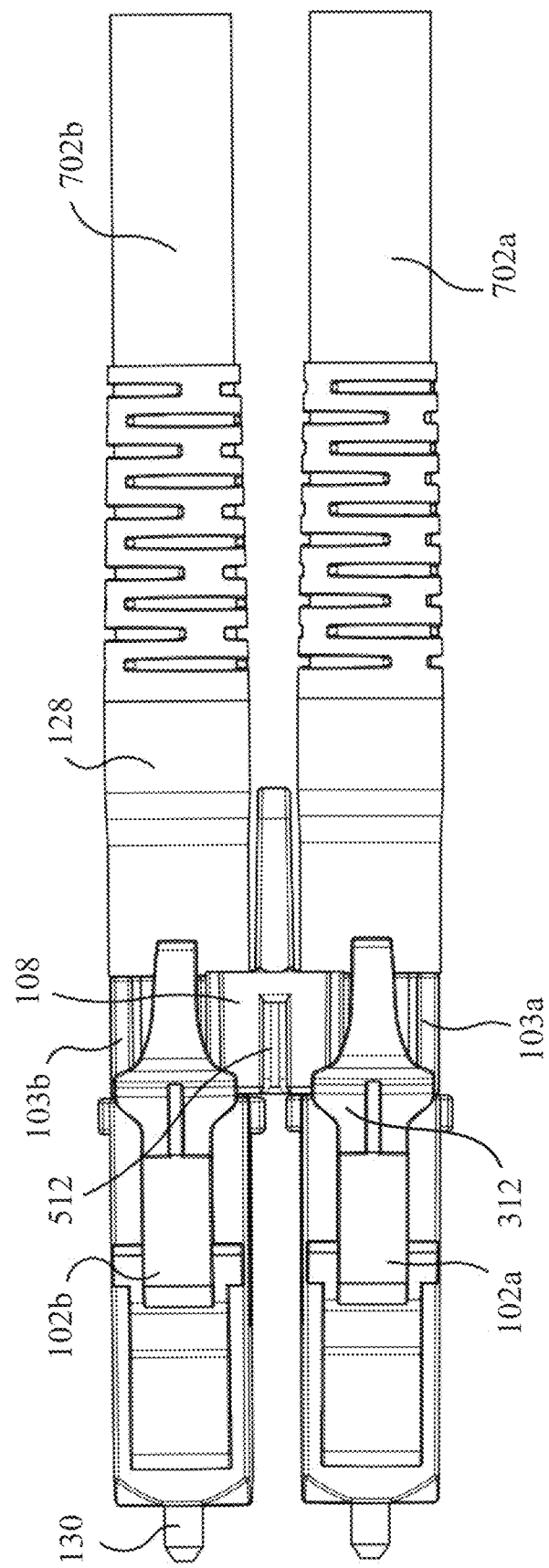
FIG. 7a is a top view of an assembled pair of simplex LC connectors, comprising a duplex clip, rear bodies held together by the duplex clip, and front bodies mounted to barrel projections of the rear bodies.
Figure 7B:
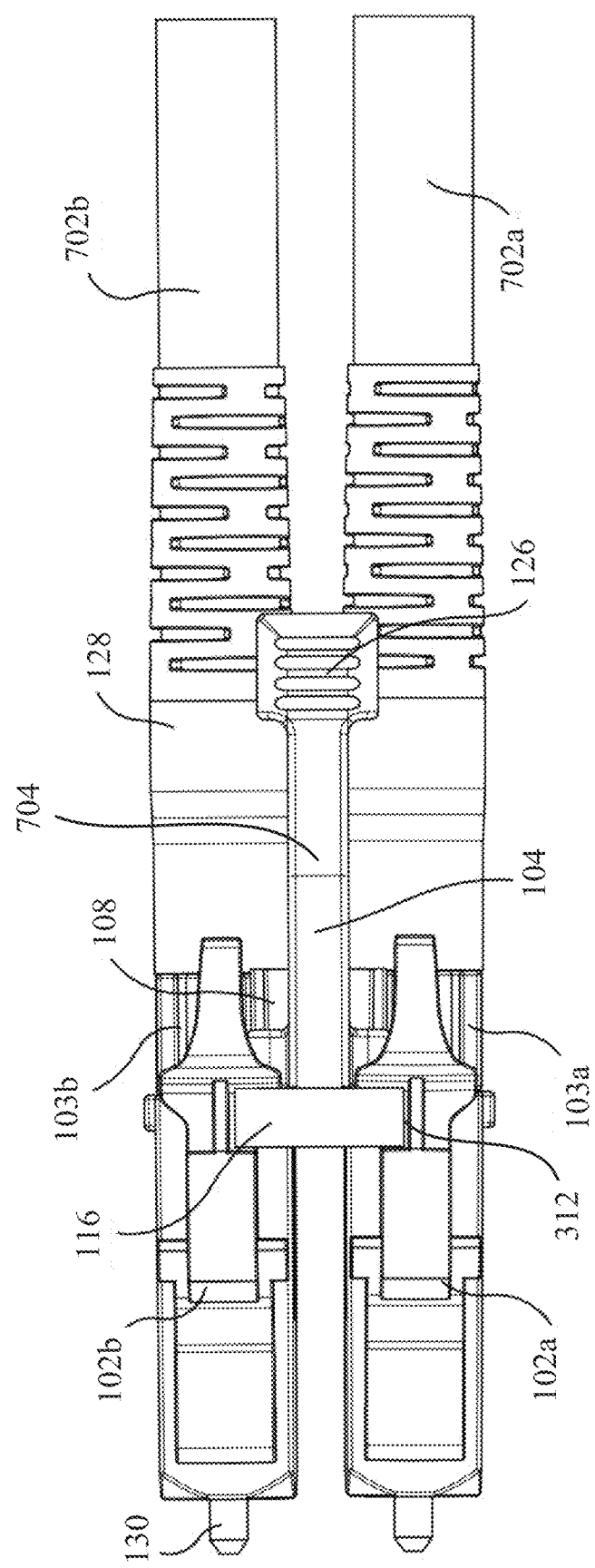
FIG. 7b is another top view of the paired simplex LC connector assembly including a puller.

FIG. 7a is a top view of the assembled pair of simplex LC connectors, comprising the duplex clip 108, rear bodies 103a, 103b held together by the duplex clip 108, and front bodies 102a, 102b mounted to the barrel projections 120 (not visible in FIG. 7a) of the rear bodies 103a, 103b. The ferrule assemblies 106 and springs (not shown) reside within the chamber formed by the front bodies 102a, 102b and rear bodies 103a, 103b, with the front tips 130 of the ferrules protruding through the front openings of the front bodies 102. Duplex clip 108 is designed to hold the two simplex LC connectors such that the spacing between the two simplex LC connectors conforms to a standard duplex spacing, allowing the paired simplex LC connector assemblies to be plugged into a duplex adapter (not shown). The lengths of the duplex clip's rails 502 (see FIG. 5) and the corresponding area of the side plates 206 of rear bodies 103a, 103b (see FIG. 2)—which are held by the rails 502—are sufficient to rigidly hold the two simplex LC connector assemblies substantially in parallel. The relatively large area of contact between the duplex clip 108 and the side plates 206 of rear bodies 103a, 103b prevents the two simplex LC connector assemblies, including terminated simplex cables 702a and 702b, respectively, from bending toward or away from each other to an excessive degree, thereby reliably maintaining this parallel arrangement. By providing a sturdy and consistent parallel orientation of the paired simplex LC connectors, this design improves user experience by ensuring that the paired simplex LC connector assembly reliably aligns with a mating duplex adapter (not shown) and maintains the parallel configuration between the duplexed fiber optic signal paths required for minimal disturbance of light signals transmitted along the optical circuits of which the duplexed LC connectors are components.

Figure 8:
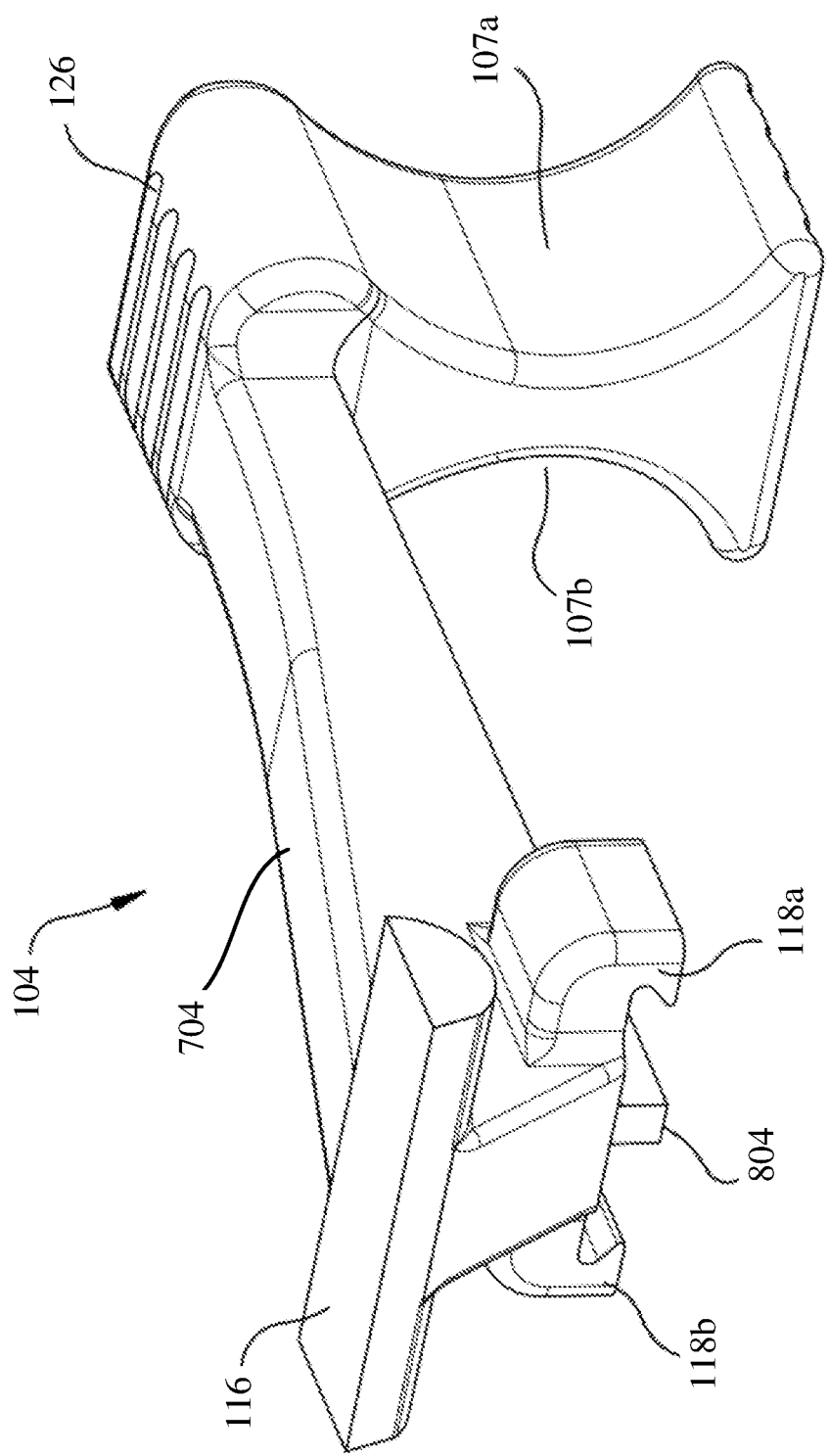
FIG. 8 is a perspective view of a puller for use with a paired simplex LC connector assembly.
Figure 9A:
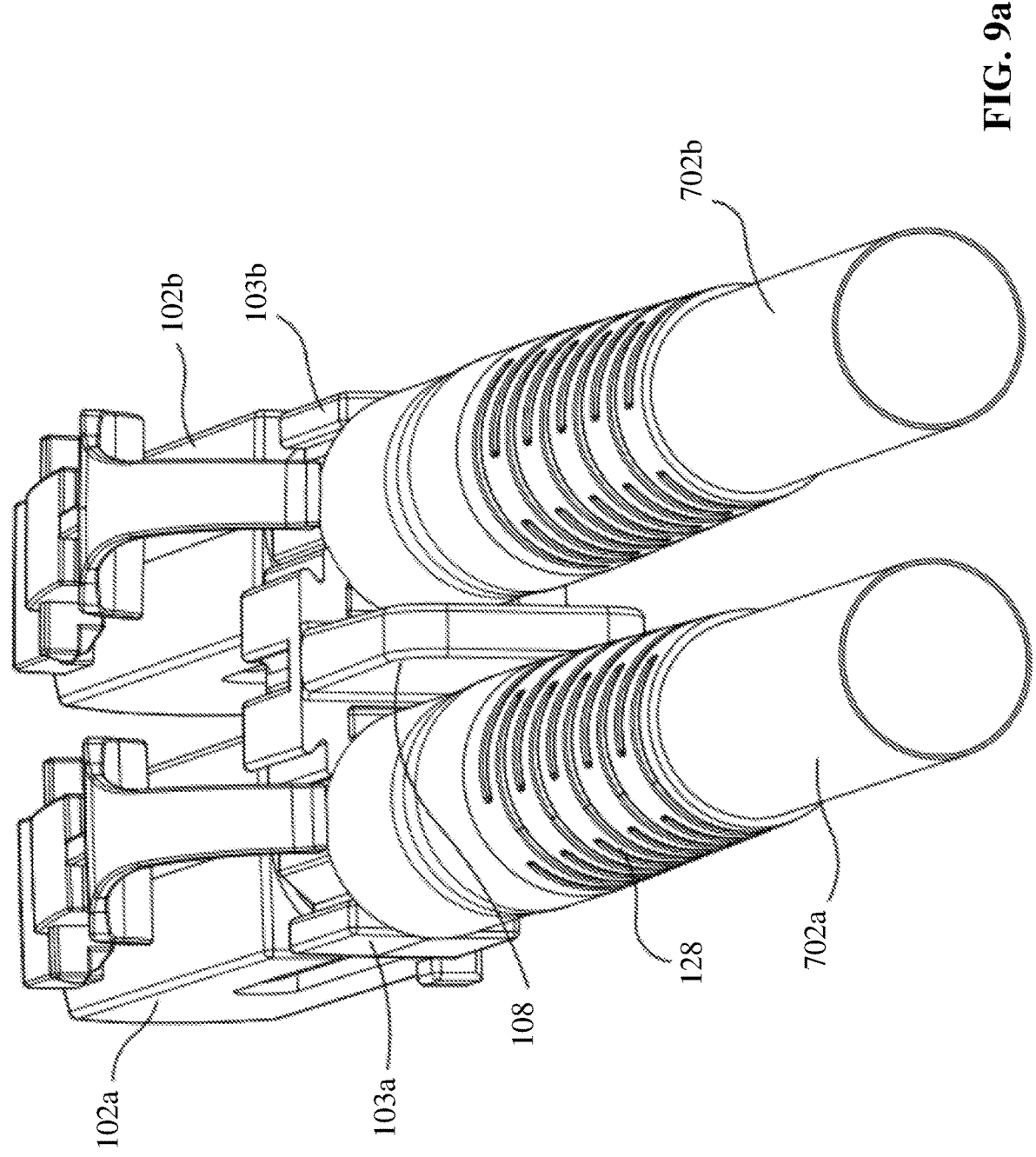
FIG. 9a is perspective rear view of the paired simplex connector assembly with the puller omitted.

A puller 104 can be added to the paired simplex LC connector assembly to improve physical access to the paired simplex LC connector assemblies to facilitate insertion into, and removal from, the corresponding duplex adapter in high density connectivity environments. FIG. 7b is another top view of the paired simplex LC connector assembly that adds a puller 104. Puller 104 includes a t-bar 116 connected to a cable anchor 126 by an arm 704. FIG. 8 is a perspective view of the puller 104 used for the paired simplex LC connector assembly according to one or more embodiments. Cable anchor 126 comprises two concave surfaces 107a and 107b adapted to accommodate the two parallel simplex cables 702a and 702b that enter each of the paired simplex LC connectors, respectively, as can be seen, for instance, in FIGS. 9a and 9b. FIG. 9a is perspective rear view of the paired simplex connector assembly with the puller 104 omitted. As described above, duplex clip 108 holds two rear bodies 103a, 103b in a parallel orientation, and two front bodies 102a, 102b are attached to the barrel projections 120 (see FIG. 2) of rear bodies 103, enclosing the ferrule assemblies 106 and springs 112 (see FIG. 1) within the resulting assemblies. As shown in FIGS. 7a, 7b, 9a, and 9b, two simplex optical cables 702a and 702b are attached to crimp cores 124a, 124b (see FIG. 1) on the rear sides of the rear bodies 103a and 103b using crimp sleeves 114, and boots 128 are slid over the crimp sleeves 114 (see FIG. 1). The optical fibers of the respective optical cables 702a, 702b enter the rear bodies 103a, 103b via crimp cores 124a, 124b and attach to the ferrule assemblies within the front bodies 102a, 102b and rear bodies 103a, 103b (see, e.g., FIG. 1).

Figure 9B:
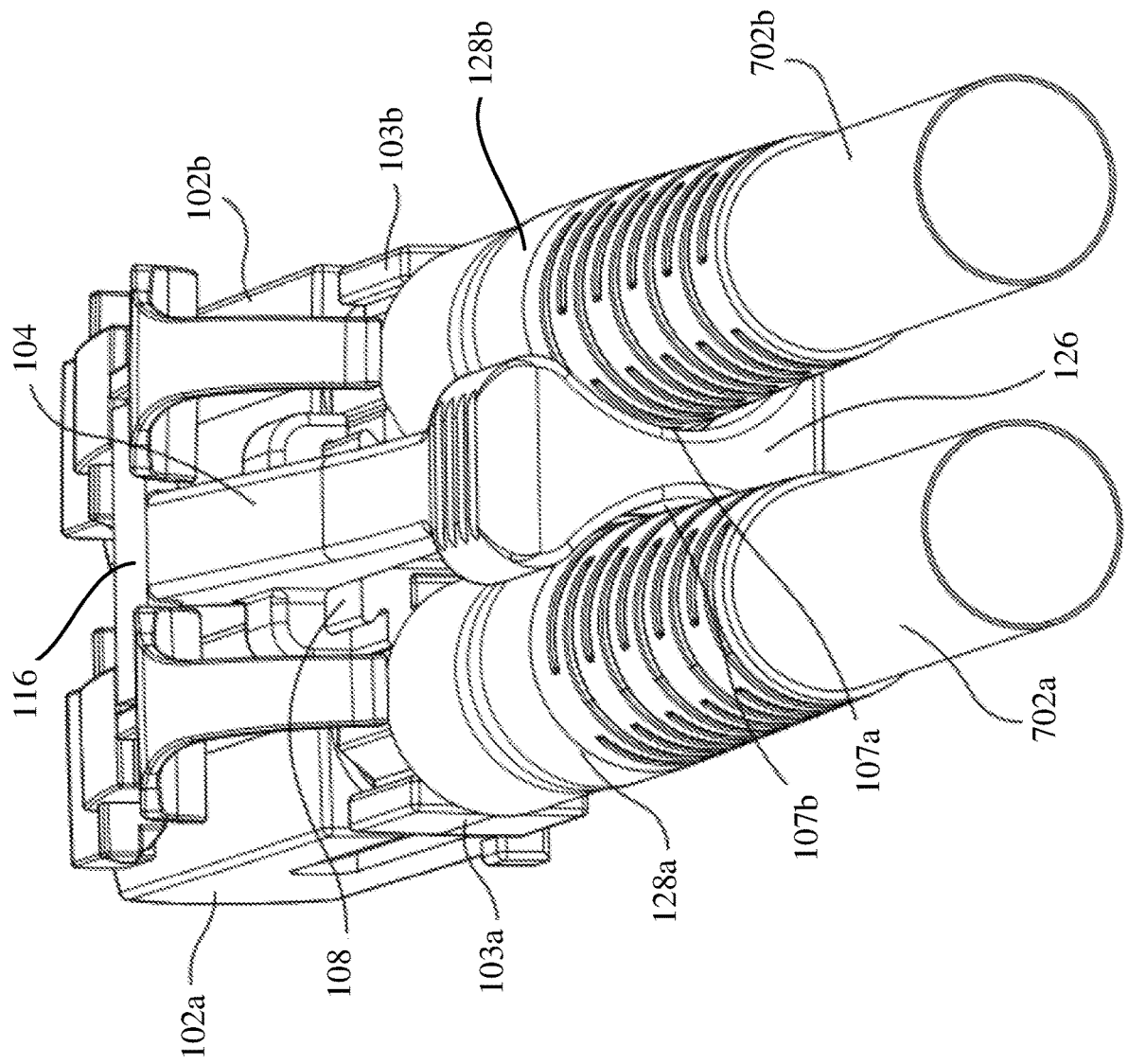
FIG. 9b is a perspective rear view of the paired simplex LC connector assembly with a puller attached.

FIG. 9b is a perspective rear view of the paired simplex LC connector assembly with puller 104 attached. The cable anchor 126 of the puller resides between the two simplex fiber optic cables 702a, 702b (e.g., between the two boots 128a, 128b), with the concave surfaces 107a, 107b of the cable anchor 126 accommodating the two simplex fiber optic cables.

Returning now to FIG. 8, protrusions 118a, 118b, 804 below the puller's t-bar 116 are designed to interlock with corresponding grooves formed by puller rails 510 on the top of duplex clip 108 (see FIG. 5). FIG. 10 is a front view of the paired simplex LC connector assembly including puller 104, with the front bodies 102a, 102b removed for clarity. As can be seen in FIG. 10, puller 104 includes three protrusions 118a, 118b, 804 below t-bar 116 that reside within corresponding grooves 514a, 514b, 512 formed by the two puller rails 510 of the duplex clip 108 (see also FIG. 5). In this illustrated embodiment, the grooves 514a, 514b, 512 defined by the two puller rails 510 include a square groove 512 between the two rails 510 (see FIG. 5), a first notched groove 514b on the left side of the left-hand puller rail 510, and a second notched groove 514a on the right side of the right-hand puller rail 510 (see FIG. 5). To affix the puller 104 on the duplex clip 108, the left and right notched grooves 514a, 514b on the clip 108 are configured to receive corresponding V-shaped rails on the left and right protrusions 118a, 118b of the puller 104. This design allows the puller 104 to be mounted on the duplex clip 108 by aligning the rails of the left and right protrusions 118a, 118b with the corresponding notched grooves 514a, 514b of the clip 108, and sliding the t-bar 116 of the puller 104 over the duplex clip 108, either from the front or rear of the duplex clip 108. In the embodiment illustrated in FIG. 10, puller 104 also includes a middle protrusion 804 that resides in the square groove 512 between the two puller rails 510 of the clip 108. This middle protrusion 804 presents a stop for the puller 104 operating within the square groove 512 between the two puller rails 510 of duplex clip 108. This middle protrusion stop prevents the puller 104 from separating from the LC connector assembly when pulled rearward, and also prevents the t-bar 116 of puller 104 from slipping rearward, and out of engagement with, recessed areas 312 disposed in latches 306 of front bodies 102a, 102b (see FIGS. 3 and 7b).

Note that similar puller rails 510 are also located on the bottom of duplex clip 108, yielding a symmetrical profile. Mirroring the puller rails 510 on both the top and bottom of the clip 108 in this manner facilitates the polarity reversal technique to be described in more detail below in connection with FIGS. 13a-13f.

Figure 11:
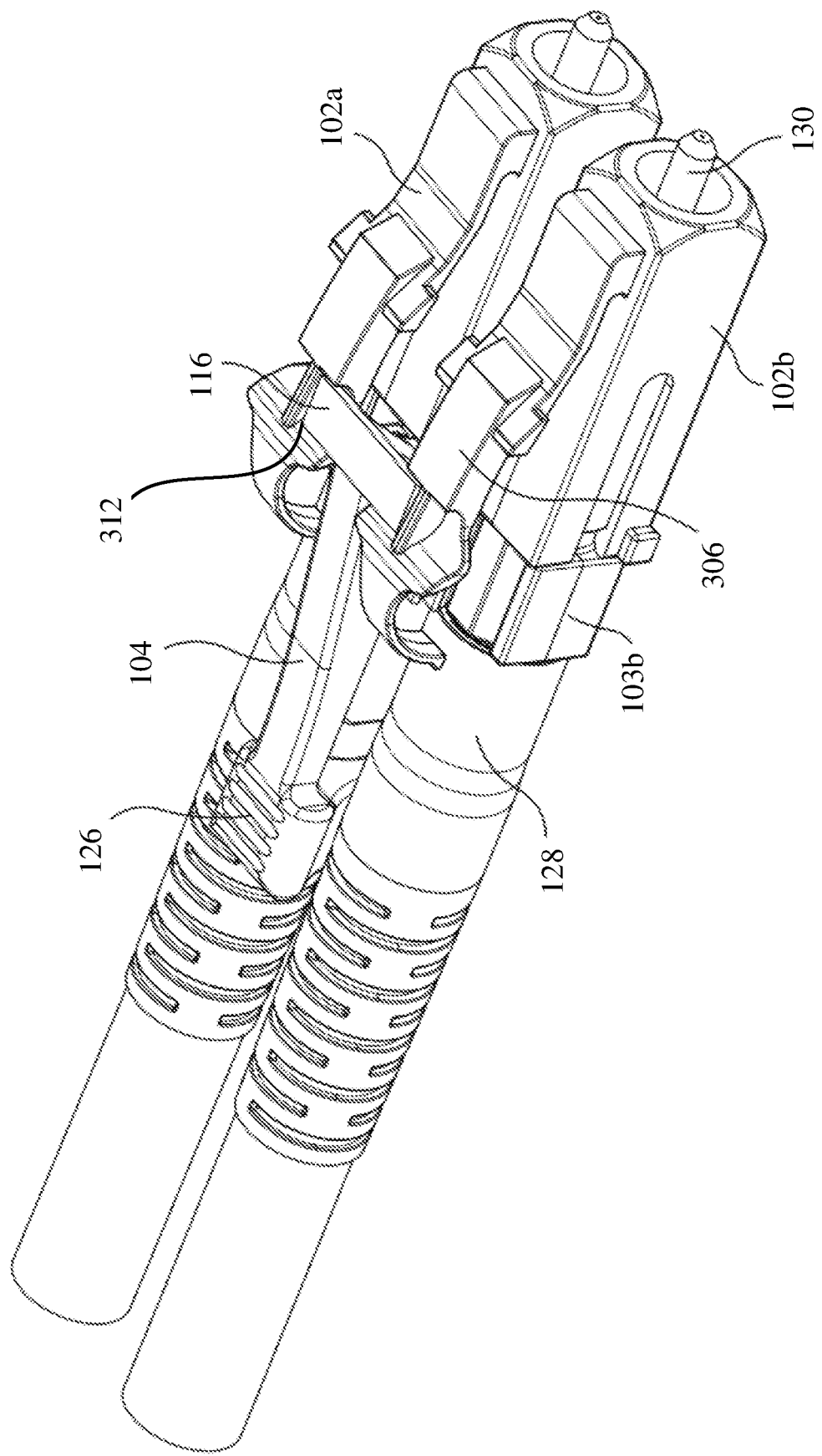
FIG. 11 is a perspective view of the paired simplex LC connector assembly including the puller.

FIG. 11 is a perspective view of the paired simplex LC connector assembly including the puller 104. With the puller 104 in place, the t-bar 116 provides an easily accessible means for removing the paired simplex LC connector assembly from a duplex adapter (not shown). Note that the left and right sides oft-bar 116 reside within the recessed areas 312 formed in latches 306 of the front bodies 102a, 102b (see FIGS. 3 and 7a), ensuring that a pulling force applied both sides of t-bar 116 is distributed substantially equally to the two simplex LC connectors of the paired LC connector assembly.

Figure 12:
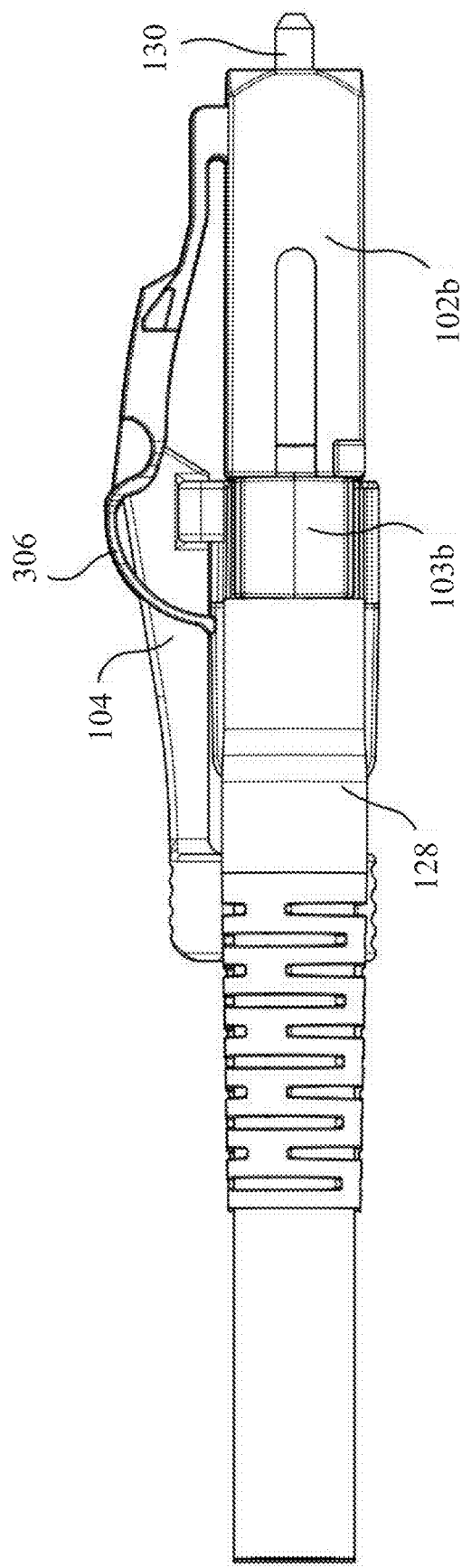
FIG. 12 is a side view of the paired simplex LC connector assembly including the puller.

FIG. 12 is a side view of the paired simplex LC connector assembly including the puller 104. Note that the puller 104 is designed such that the addition of the puller 104 to the paired LC connector assembly does not introduce additional height to the paired LC connector assembly's vertical profile. That is, the top surface of the puller 104 does not extend upward past the top surface of the latches 306 of front bodies 102a, 102b. This ensures that the puller 104 will not interfere with adjacent connectors or cables in high density connectivity installations.

The design of the paired simplex connector described above allows the polarity of the fiber optic circuitry of the connectors and cabling to be reversed easily in the field with little or no risk of twisting or tangling the optical fibers comprising the circuit, even when a puller (e.g., puller 104) is included as part of the connector assembly. FIGS. 13a-13f are orthographic views of the paired simplex LC connector assembly illustrating a sequence for reversing the polarity of the fiber optic circuitry.

Figure 13A:
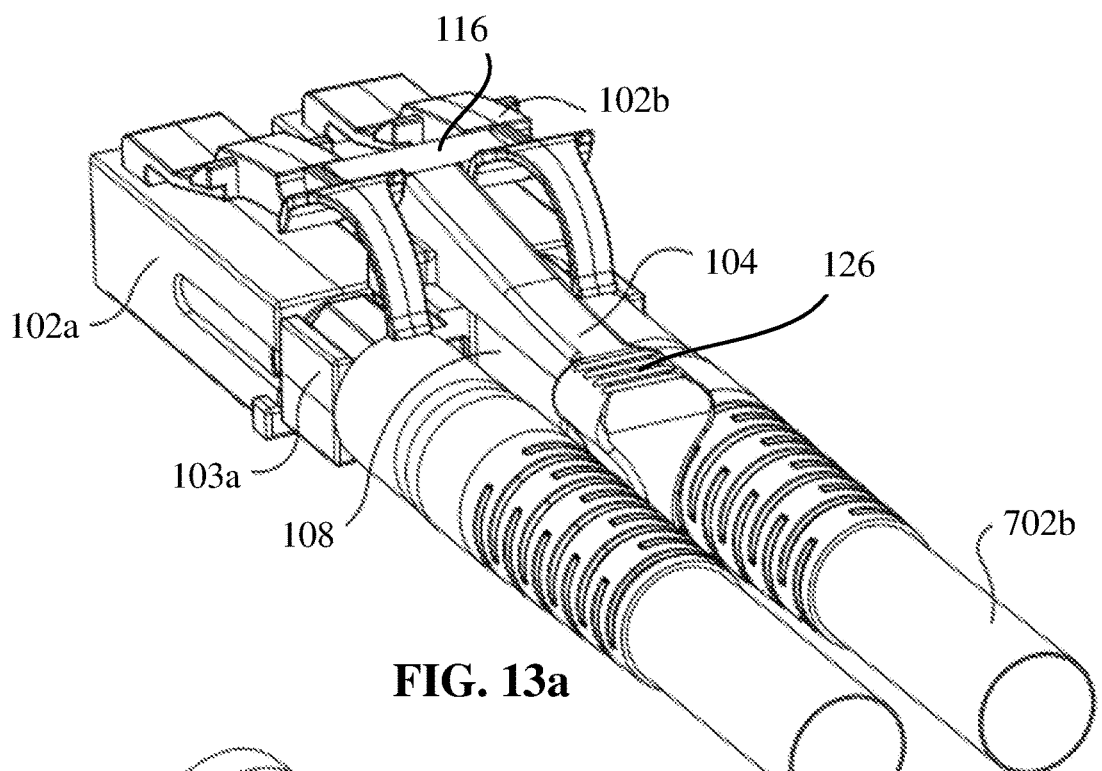
FIGS. 13a-13f are orthographic views of a paired simplex connector with a duplex clip and puller illustrating a sequence for reversing the polarity of the connector.

FIG. 13a is a perspective rear view of the paired simplex LC connector assembly, which is used to connect two simplex fiber optic cables 702a and 702b to a duplex adapter. In the current default polarity, cable 702a is connected to the left side of the paired simplex LC connector assembly while cable 702b is connected to the right side. Thus, when the paired simplex LC connector assembly is plugged into a duplex adapter (not shown in the figures), cable 702a will be plugged into the left port of the duplex adapter while cable 702b will be plugged into the right port of the duplex adapter.

Figure 13B:
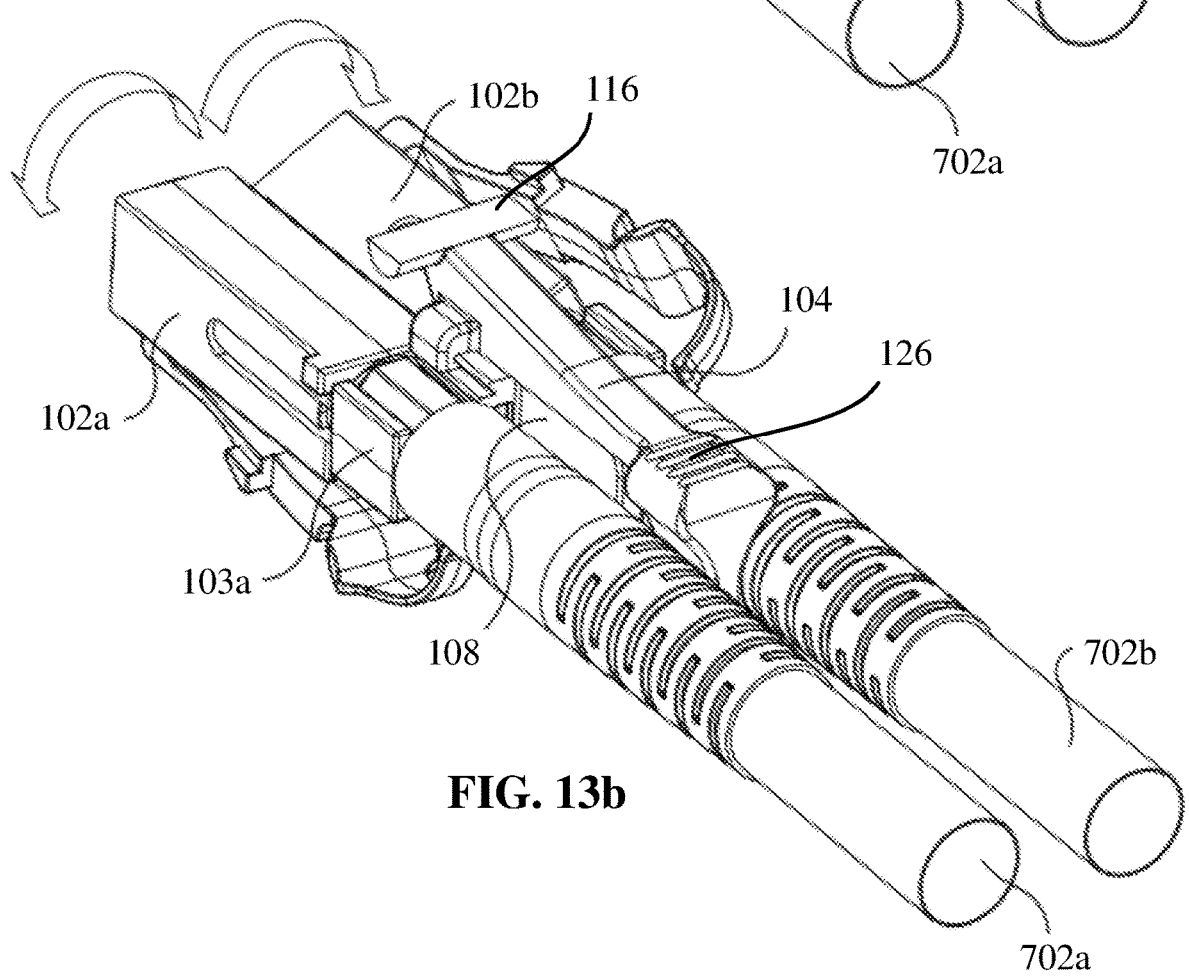

To reverse the polarity of the paired simplex LC connectors, and corresponding cables 702a, 702b, comprising the assembly, the following steps can be carried out. As shown in FIG. 13b, the front bodies 102a, 102b are rotated 180 degrees about the barrel projections 120 of rear bodies 103a, 103b. Since the front bodies 102a, 102b are mounted in a rotatable manner on the barrel projections 120, and the ferrule assemblies 106 are installed inside the barrel projections 120 in a fixed manner, the front bodies 102a, 102b can be rotated without causing a corresponding rotation of the ferrule assemblies 106, thereby preventing twisting of the ferrule assemblies 106 and the optical fibers disposed therein. At the completion of this step in the polarity reversal process, the paired simplex LC connectors of the assemblies are in an upside-down orientation relative to their starting orientations.

Figure 13C:
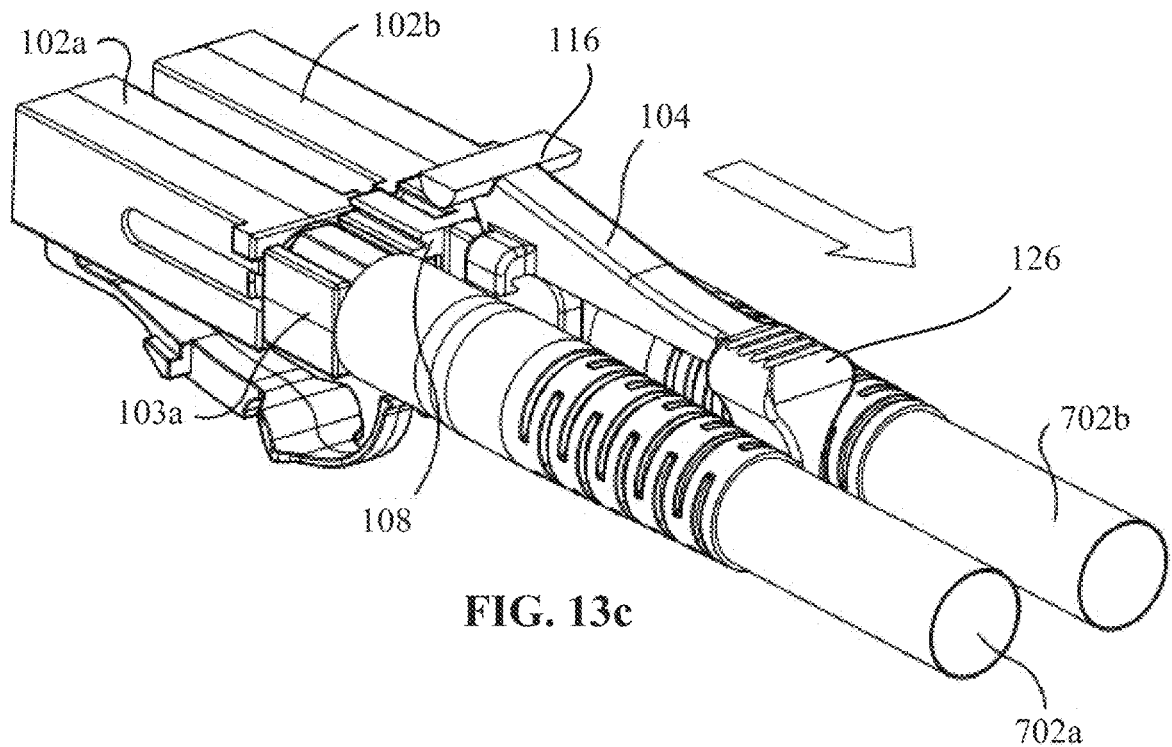
Figure 13D:
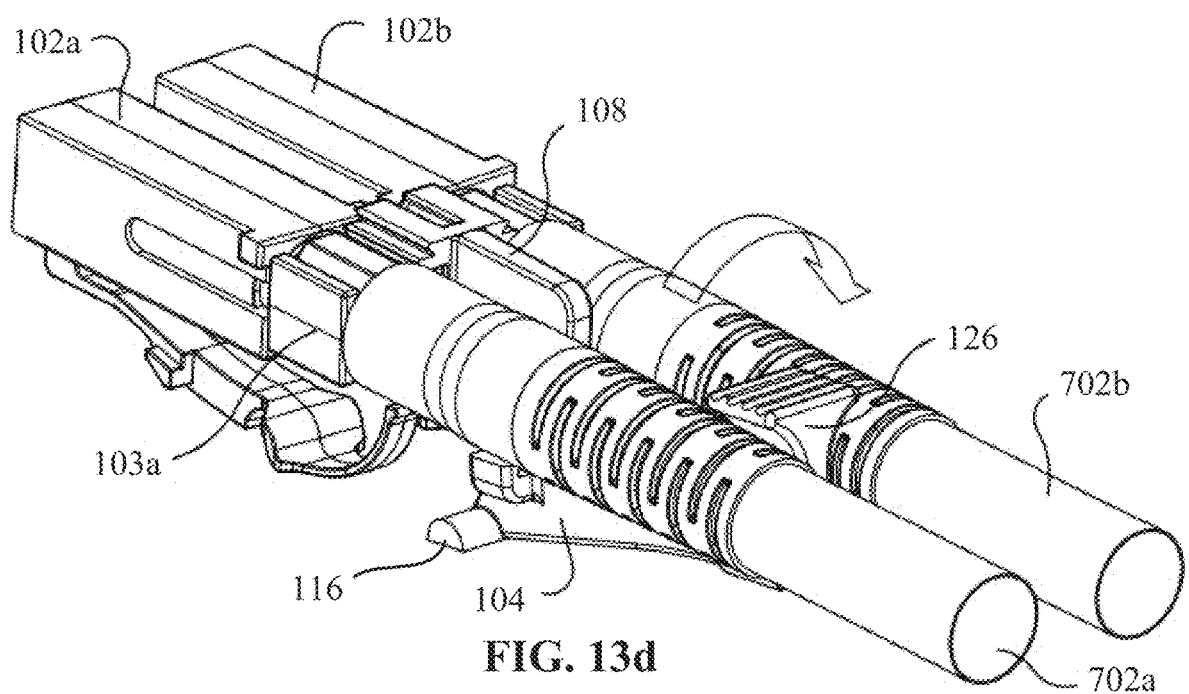
Figure 13E:
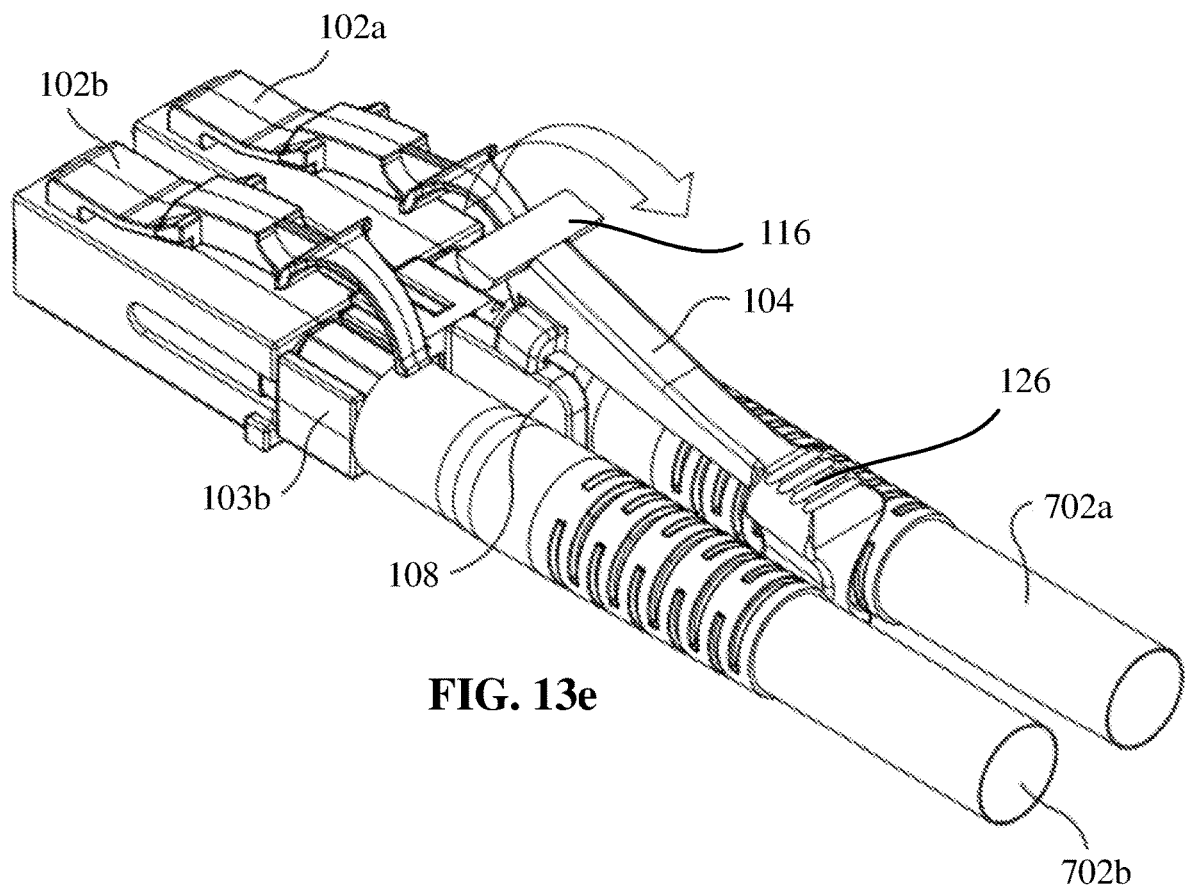

Next, as shown in FIG. 13c, the puller 104 is removed from the paired simplex LC connector assembly. In the case of the paired simplex assembly with duplex clip 108, this can be achieved by sliding the puller 104 forward, away from cables 702a, 702b, so that the t-bar 116 of puller 104 can be disengaged from the recessed areas 312 in the latches 306 of front bodies 102a, 102b, and thereby disconnecting the protrusions 118a, 118b, 804 of puller 104 from the puller rails 510 on top of the duplex clip 108. The puller 104 can then be pulled backward toward the cables 702a, 702b to facilitate removal of the puller 104 from the paired simplex LC connector assembly. The cable anchor 126 of puller 104 is held between the two cables 702a, 702b, minimizing the risk of the puller 104 falling from the paired simplex LC connector assembly during this step of the polarity reversal process. The puller 104 is then moved to the opposite side of the paired simplex LC connector assembly, as shown in FIG. 13d. At this stage, the puller 104 is not yet reattached to the duplex clip 108. The entire paired simplex LC connector assembly is then rotated, as shown in FIG. 13e. Note that this rotation causes cables 702a and 702b to be reversed in position relative to the duplex clip 108, while also causing the paired simplex LC connector assembly to be reoriented in the right-side-up position. Finally, the puller 104 is reattached to the duplex clip 108 by aligning the protrusions 118a, 118b, 804 of puller 104 with the puller rails 510 on the duplex clip 108 and sliding the puller 104 backward, causing the front of the puller 104 to engage with the clip 108. Note that the puller rails 510 on the duplex clip 108 to which the puller 104 is attached during this step are those that were located on the bottom of the clip in FIG. 13a, but which are now in the top position due to the rotation during polarity reversal shown in FIG. 13e. Since the same puller rails 510 are located on both the top and bottom of the duplex clip 108, the polarity reversal can be achieved without disconnecting the clip 108 from the rear bodies 103.

Figure 13F:
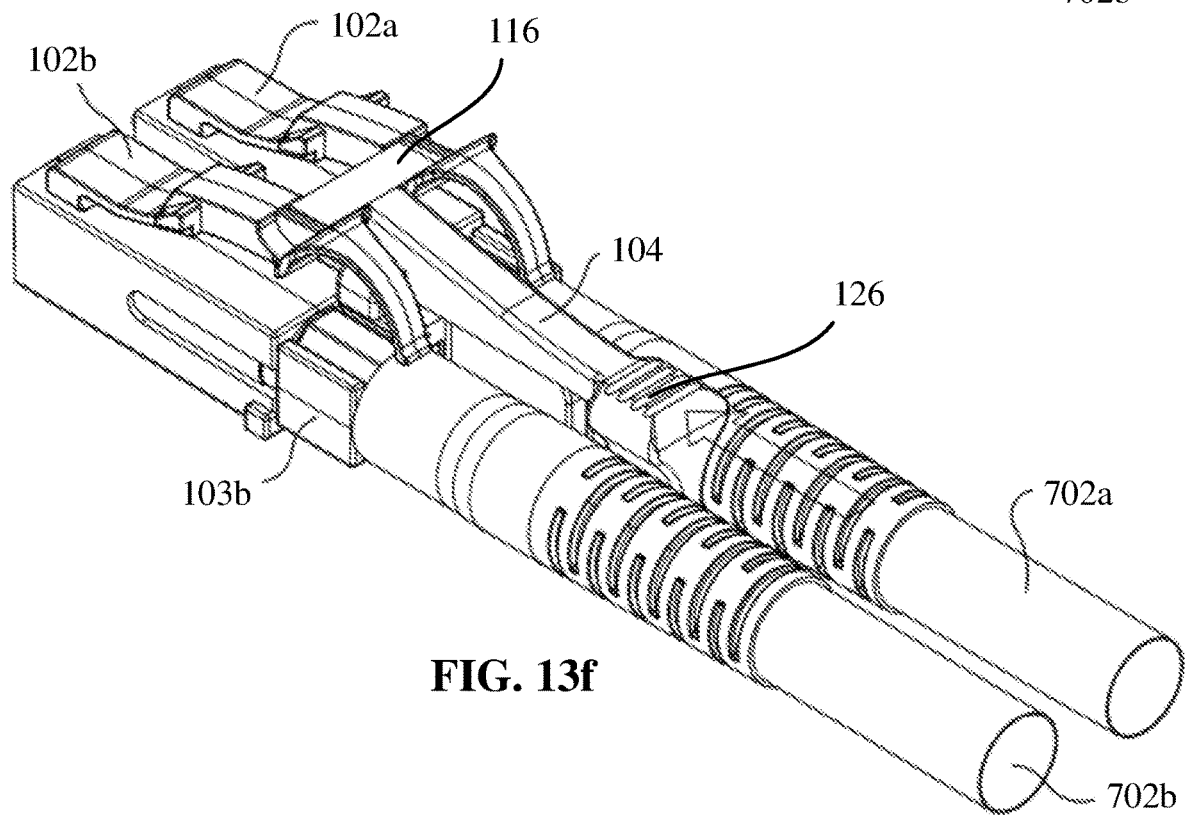
Figure 14D:
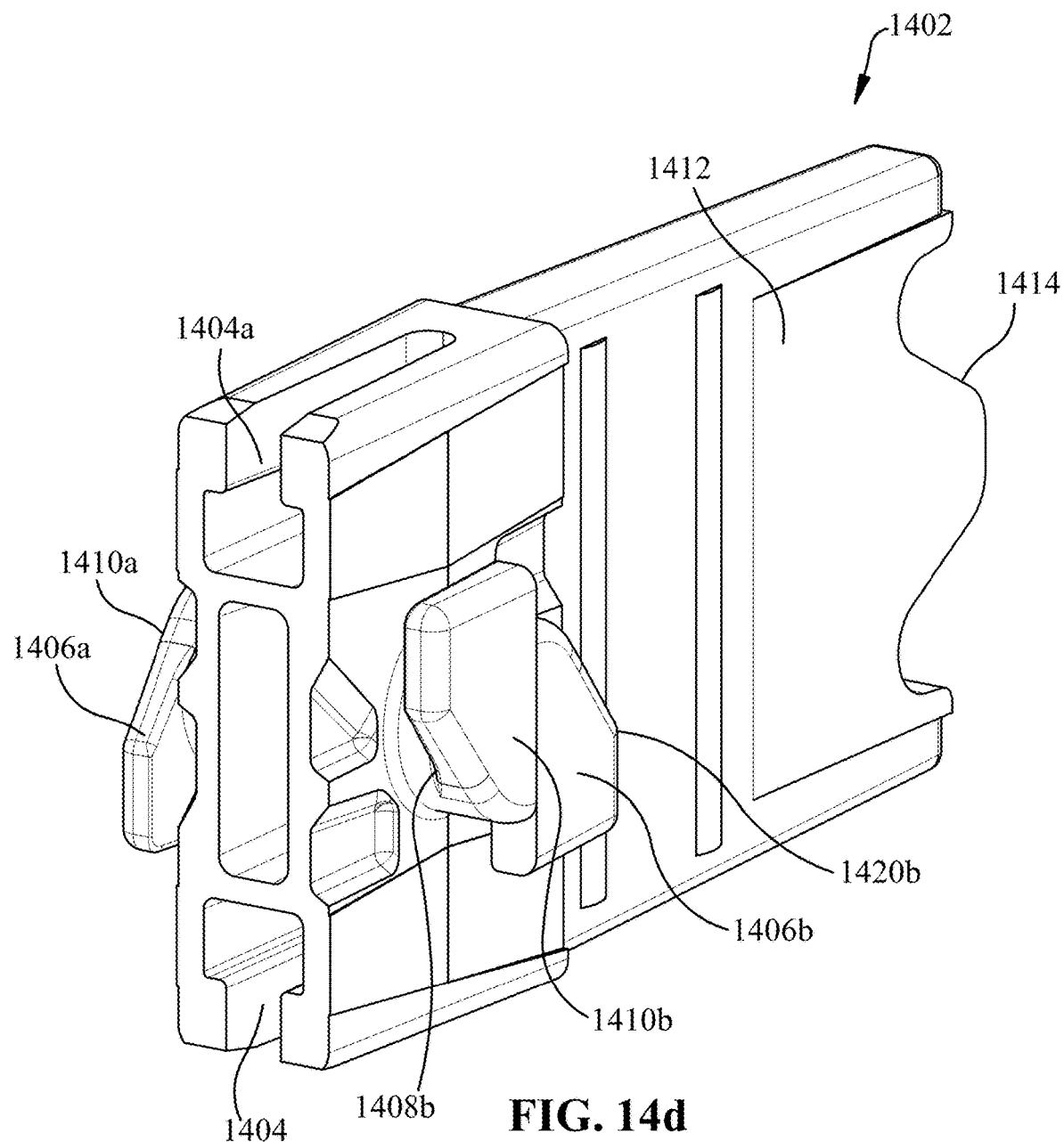
FIG. 14d is a perspective view of the example clip that supports rotational mounting of the front bodies to yield a paired simplex LC connector assembly.

As shown in FIG. 13f, cables 702a and 702b have reversed position relative to the position of cables 702a and 702b shown in FIG. 13a, such that cable 702b will be plugged into the left port of a duplex adapter, and cable 702a will be plugged into the right port. Reversal of the polarity of the cabling and is now complete.

The procedure outlined above in connection with FIGS. 13a-13f allows a user to quickly and easily reverse the polarity of the duplexed connector in the field without twisting or damaging the optical fibers connected to the ferrules inside the connector housings, and without requiring the user to disassemble the connector housing in order to access the ferrule assemblies housed therein. The design of the paired simplex connectors described herein allow this polarity reversal feature to be implemented even when a puller is included as part of the connector assembly, since the puller can be easily relocated to the appropriate side of the connector as needed.

In some embodiments, the clip and rear bodies can be designed to allow the rear bodies 1502 (see FIGS. 15a-15c) to be mounted to the clip using a rotational action instead of a sliding action. FIGS. 14a, 14b, 14c, and 14d are a front view, side view, bottom view, and perspective view, respectively, of an example clip 1402 that supports rotational mounting of simplex connectors to yield a paired simplex LC connector assembly. In contrast to duplex clip 108 (see FIG. 5), which uses rails 502 to hold the rear bodies 103 in place by engaging with the rear bodies' side plates 206, clip 1402 comprises two side arms 1410a, 1410b formed on respective two sides of elongated plate 1412. Each side arm 1410a, 1410b comprise a hub 1408a, 1408b that extends from the plate 1412 and a flange 1406a, 1406b formed on the end of the hub 1408a, 1408b. In some embodiments, the flange 1406a, 1406b can have a non-circular, rotationally symmetrical shape having a lengthwise axis 1418 (that is, an axis that runs along a length of the flange 1406) that runs at an angle (diagonally) relative to the lengthwise axis 1416 of the clip 1402 (see FIG. 14b). Each flange 1406 is shaped such that corners 1420a and 1420b are formed on its front and rear edges, respectively, at rotationally symmetric locations on the flange 1406.

Grooves 1404a and 1404b are formed on the front top edge and front bottom edge respectively, of plate 1412. These grooves 1404a, 1404b are configured to receive a protrusion formed on the puller, as will be described below.

Figure 15A:
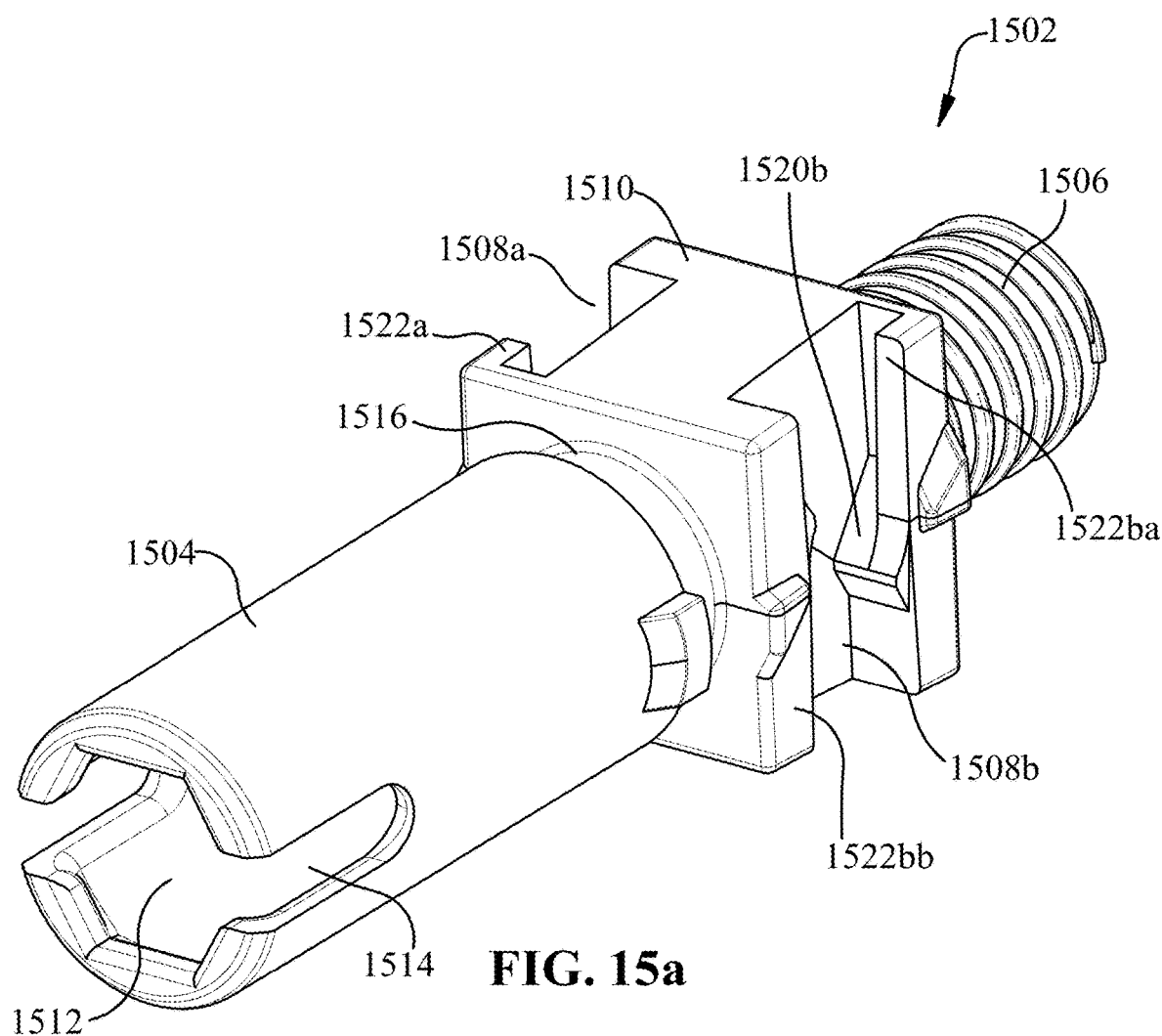
FIG. 15a is a perspective view of an example rear body designed to engage with the clip illustrated in FIGS. 14a-14d.
Figure 15B:
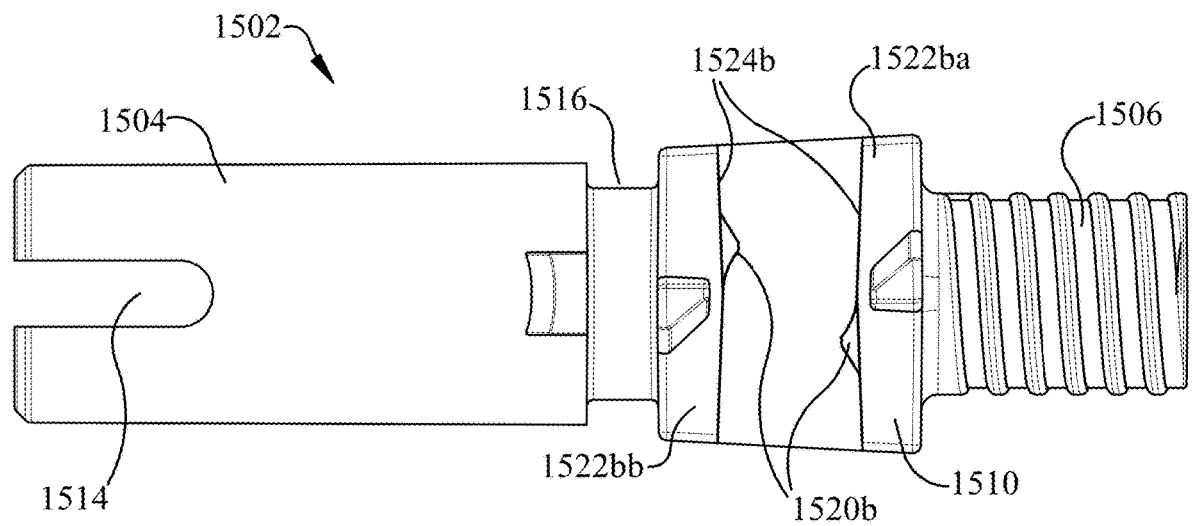
FIG. 15b a side view of the example rear body designed to engage with the clip illustrated in FIGS. 14a-14d.
Figure 15C:
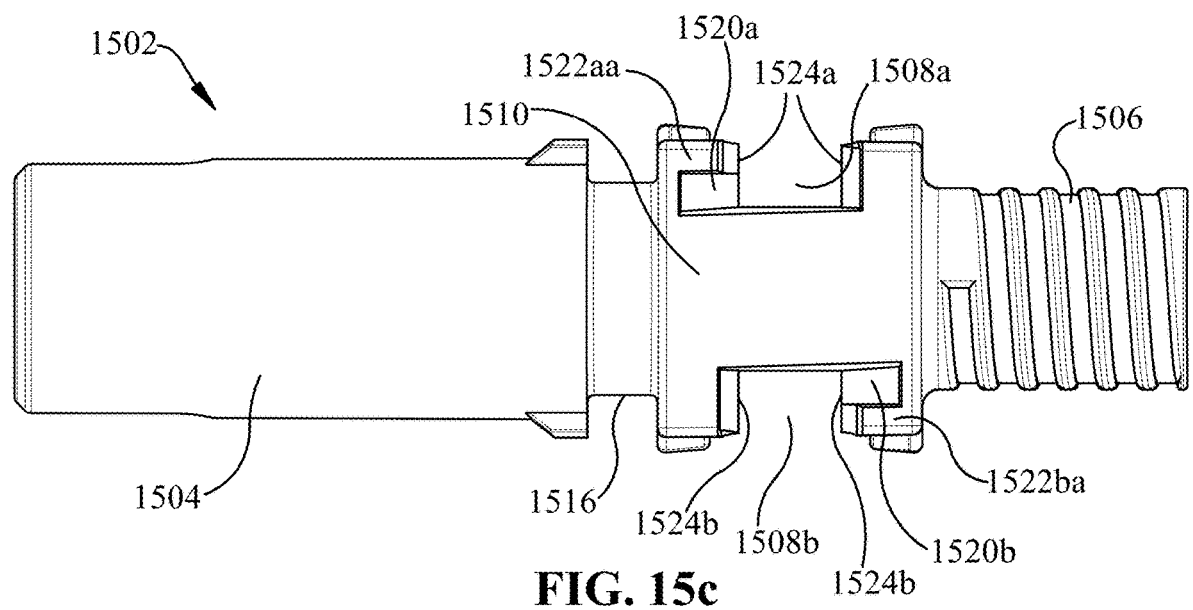
FIG. 15c is a top view of the example rear body designed to engage with the clip illustrated in FIGS. 14a-14d.

FIG. 15a is a perspective view of an example rear body 1502 designed to engage with clip 1402. FIG. 15b is a side view of rear body 1502, and FIG. 15c is a top view of rear body 1502. Rear body 1502 comprises a hollow barrel projection 1504 (which may be similar to barrel projection 120) and a crimp core 1506 (which may be similar to crimp core 124). Barrel projection 1504 comprises a front opening 1512 and one or more slots 1514 to allow a degree of flexibility when installing a ferrule assembly 106 (see FIG. 1). A fiber optical cable (not shown but may be similar to simplex fiber optic cables 702a, 702b shown in, e.g., FIG. 7a) can enter the hollow crimp core 1506 and connect to the ferrule assembly 106 (see FIG. 1) inside the rear body 1502. Similar to rear body 103, rear body 1502 is configured to receive front body 102 (see FIG. 1) over its barrel projection 1504. Accordingly, a step or groove 1516 is formed at the base of barrel projection 1504, and either fully or partially traverses the circumference of the barrel projection 1504. The groove 1516 is configured to receive the raised ridges 302 along the rim of the rear opening 308 of the front body 102 (see FIG. 3).

In contrast to rear body 103 (see FIG. 2), the section between the barrel projection 1504 and crimp core 1506 of rear body 1502 comprises a block 1510 having channels 1508*a* and 1508*b* formed on its left and right sides, respectively. As can best be seen in FIG. 15*c*, the opposing walls 1524*b* of channel 1508*b* each have a detent 1520*b* formed thereon. Channel 1508*a* on the opposite side of block 1510 has similar detents 1520*a* formed on its opposing walls 1524*a*. The pair of opposing detents 1520*a*, 1520*b* in a given channel 1508*a*, 1508*b* are offset vertically from one another, yielding channels 1508*a*, 1508*b* having shapes that are designed to engage with the side arms 1410*a*, 1410*b* of clip 1402 (see, e.g., FIG. 14*a*) using a rotational action, as will be described in more detail below. Since each detent 1520 is located along its respective channel wall 1524 at a point offset from the middle of the channel wall, each detent 1520 divides its channel wall 1524 into a long section and a short section. As can be seen in FIGS. 15*a* and 15*c*, the long section of each channel wall 1524 comprises an overhanging ridge 1522 configured to engage with an edge of the flange 1406 when the rear body 1502 is engaged with the clip 1402, as will be described below. In the example depicted in FIG. 15*a*, one ridge (e.g., ridge 1522*ba* of channel 1508*b* or ridge 1522*aa* of channel 1508*a*) is located on the upper portion of its channel wall 1524, and the opposing ridge (e.g., ridge 1522*bb* of channel 1508*b*) is located at the lower portion of its channel wall 1524.

The width of the flange 1406 (that is, the width of the flange 1406 in the direction perpendicular to the lengthwise axis 1418 of flange 1406 as shown, e.g., in FIG. 14*b*) is less than the width of channel 1508, allowing the flange 1406 to reside within the channel 1508 when the length of the channel 1508 is aligned with the length of the flange 1406. When the rear body 1502 is oriented at a first angle relative to the clip 1402, the lengths of the channel 1508 and the flange 1406 are aligned, and the channel 1508 can fit over the flange 1406 such that the flange 1406 resides within the channel. While in this position, the rear body 1502 can be rotated about the flange 1406 to a second angle, causing the rear body 1502 to engage with the flange 1406, thereby affixing the rear body 1502 to the clip. This procedure will be described in more detail below.

Figure 16A:
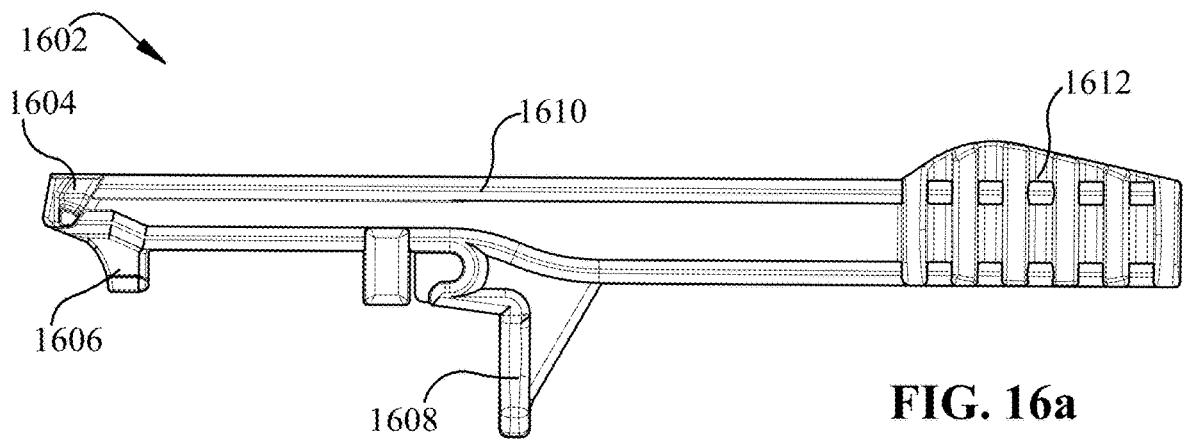
FIG. 16a is a side view of an example puller.
Figure 16B:
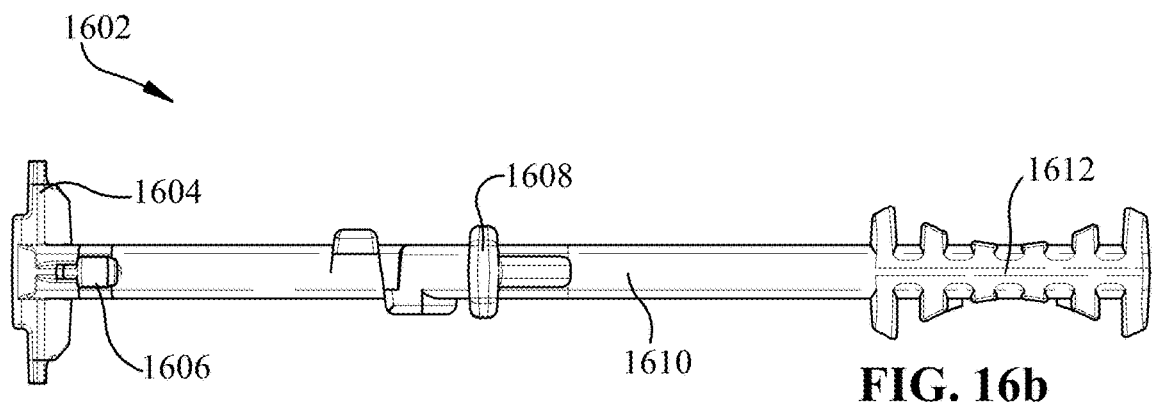
FIG. 16b is a bottom view of the example puller.
Figure 16C:
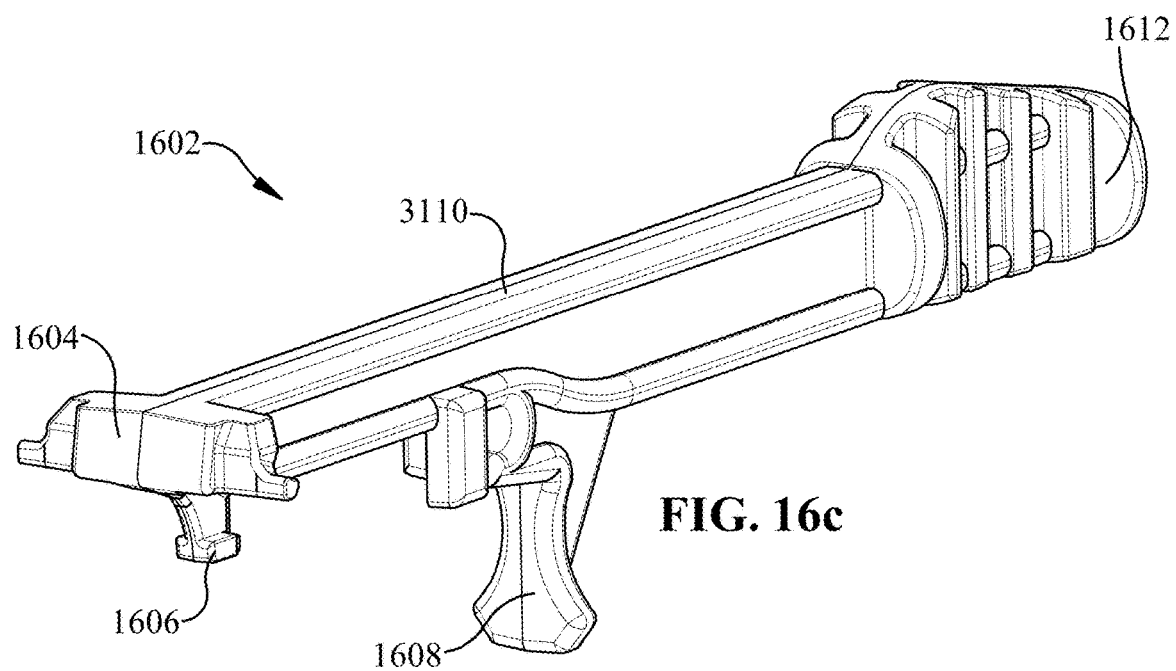
FIG. 16c is a perspective view of the example puller.

FIG. 16*a* is a side view of an example puller 1602 that can be used with the embodiment described above in connection with FIGS. 14*a*-15*c*. FIG. 16*b* is a bottom view of puller 1602, and FIG. 16*c* is a perspective view of puller 1602. Similar to puller 104 depicted in FIG. 8, puller 1602 comprises an arm 1610 with a t-bar 1604 formed on one end. A tail formation 1612 is formed on the opposite end of arm 1610 and serves as a purchase for a user's fingers when the connector assembly is being disconnected from a duplex port. A tongue 1608 is formed on the bottom of arm 1610 and is configured to abut against the rear edge 1414 of clip 1402 (see, e.g., FIG. 14*a*) while the paired simplex LC connector is being assembled. A protrusion 1606 is formed below the t-bar 1604 and is configured to reside in one of the two grooves 1404*a* or 1404*b* of clip 1402 (see, e.g., FIG. 14*a*) when the LC connector is assembled.

Figure 17A:
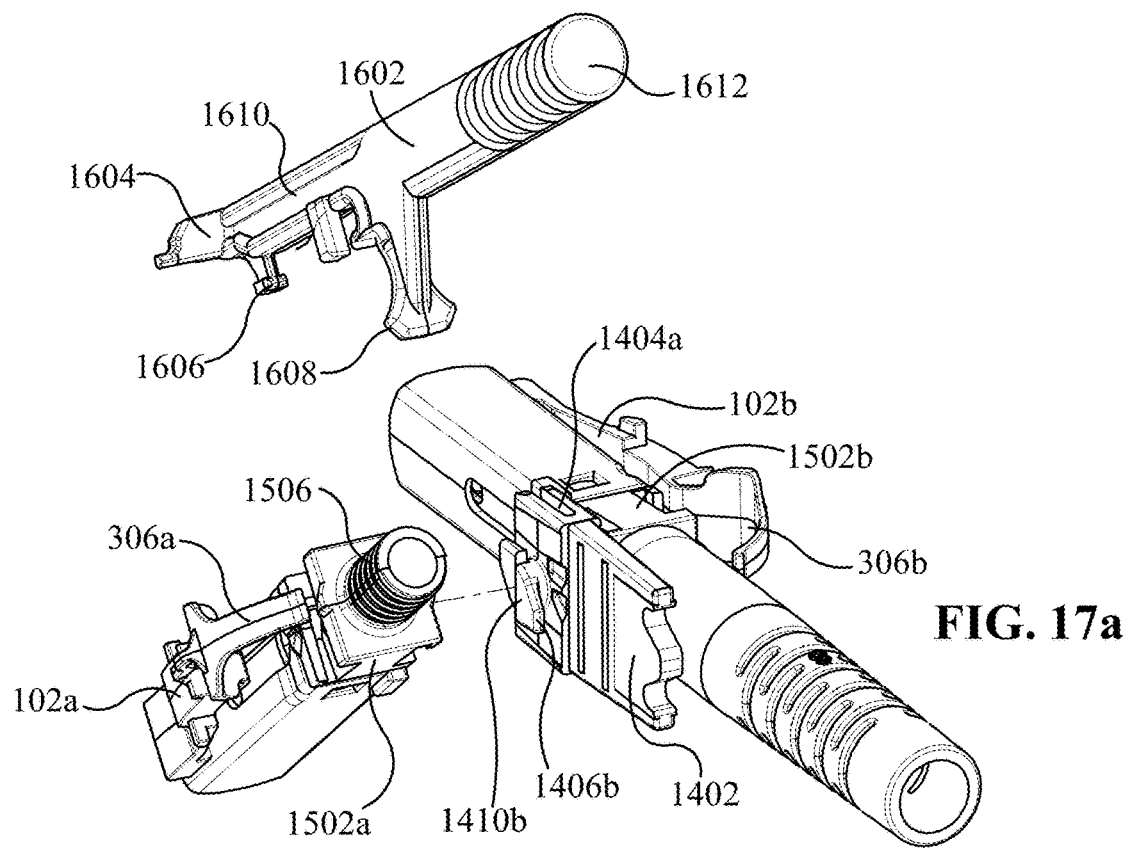
FIGS. 17a-17i are perspective views illustrating a sequence for assembling two simplex connectors, a clip, and a puller to yield a paired simplex connector.
Figure 17B:
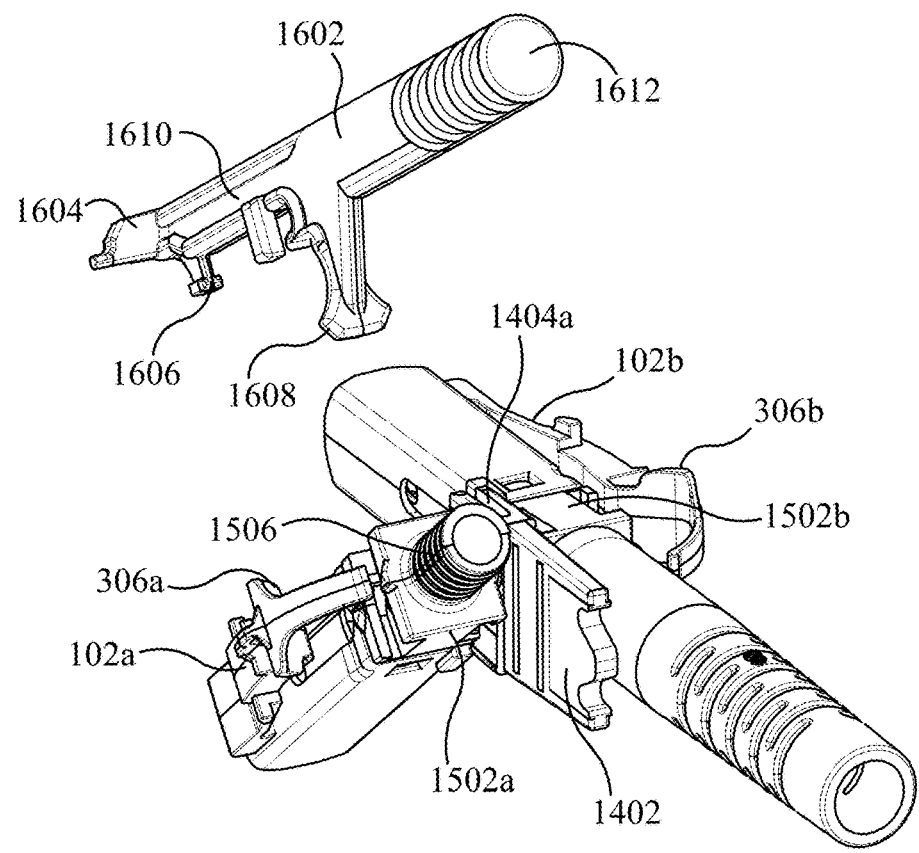

FIGS. 17*a*-17*i* illustrate a sequence for assembling two simplex connectors—comprising rear bodies 1502*a* and 1502*b* fitted with respective front bodies 102*a* and 102*b*—clip 1402, and puller 1602 to yield a paired simplex connector. FIG. 17*a* depicts one simplex connector—comprising rear body 1502*b* and front body 102*b*—already attached to clip 1402, and the other simplex connector—comprising rear body 1502*a* and front body 102*a*—in the process of being attached to clip 1402. To attach the simplex connector to clip 1402, the assembled simplex connector is tilted downward at a first angle relative to the clip's horizontal lengthwise axis (see axis 1416 in FIG. 14*b*) and positioned over the clip's side arm 1410*b* such that one of the two channels 1508*a* or 1508*b* is aligned with the side arm 1410*b*, as shown in FIG. 17*a*. FIG. 18 is another perspective view depicting this alignment from a different angle. In this position, the length of the channel 1508 facing the side arm 1410*b* is oriented to align with the length of the flange 1406*b*. The connector is then brought into contact with side arm 1410*b* such that the flange 1406*b* resides within the channel 1508 (either channel 1508*a* or 1508*b*), as shown in FIG. 17*b* and, from another angle, FIG. 18*b*. The flange 1406*b* and channel 1508 are shaped such that the flange 1406 will fit within the channel 1508 when the flange's lengthwise axis (see axis 1418 in FIG. 14*b*) is substantially aligned with the path of channel 1508.

Figure 17C:
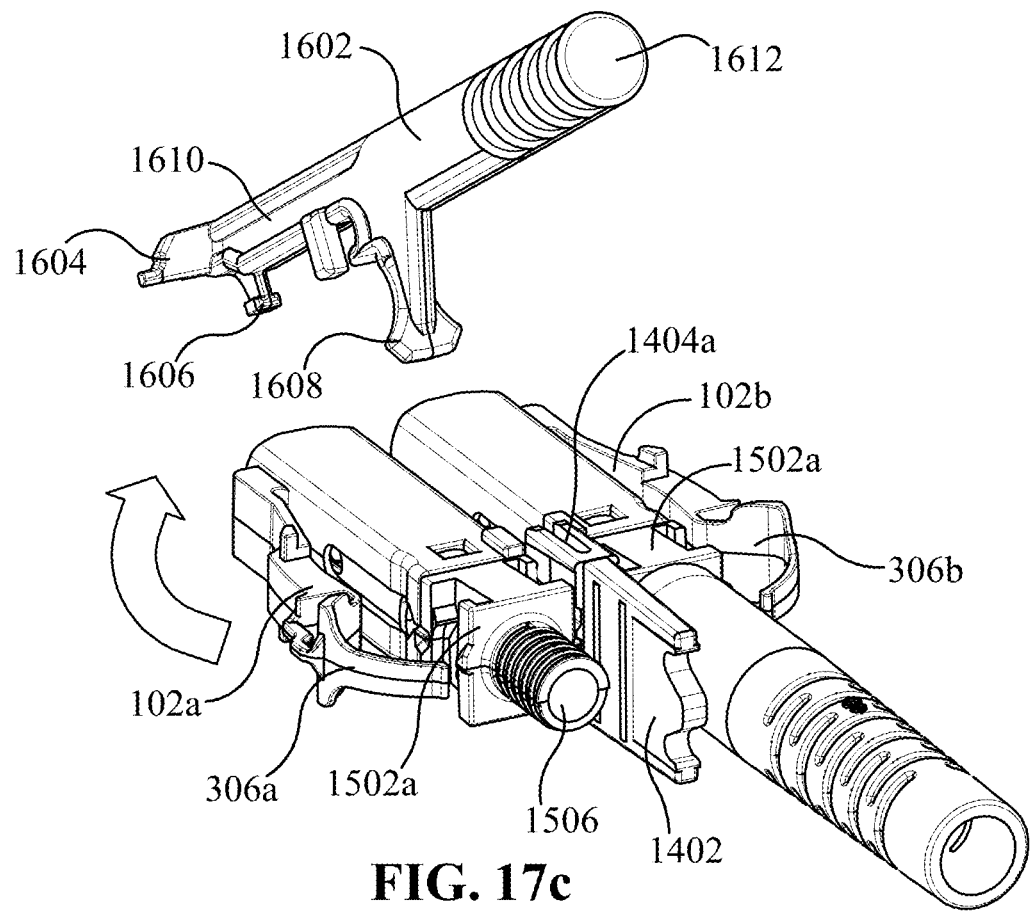
Figure 19:
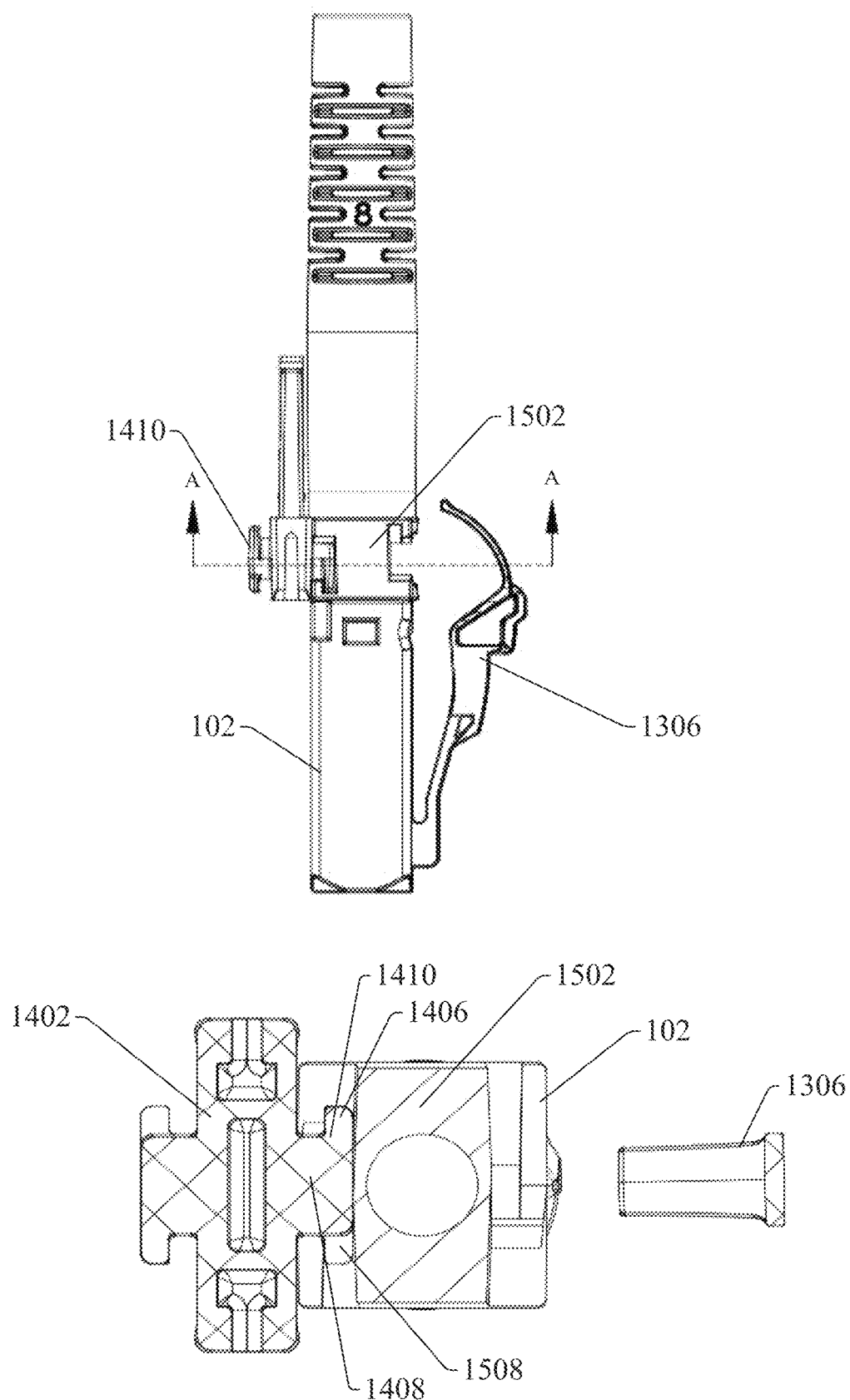
FIG. 19 is a cross-sectional view depicting engagement of a simplex connector with a clip.

As shown in FIG. 17*c* and FIG. 18*c* (from respective different perspective angles), with the connector in place such that the flange 1406*b* resides within the channel 1508 of the rear body 1502*a*, rear body 1502*a* is rotated upward (clockwise) about the side arm 1410*b* to a second angle relative to the clip 1402, which brings the front body 102*a* and rear body 1502*a* substantially into alignment with the lengthwise axis of the clip 1402 (substantially horizontally in the orientation depicted in FIG. 17*c*). During this rotational travel, corners 1420*a* and 1420*b* on the flange 1406*b* will come into contact with the detents 1520*a* and 1520*b* on the channels walls of rear body 1502*a* before rotation to the horizontal is complete. Applying additional rotational pressure causes the detents 1520*a* and 1520*b* to overcome the resistance applied by the corners 1420 of flanges 1406*b*, snapping the simplex connector in place in the horizontal position with the corners 1420 behind the detents 1520. This movement also causes the two sides of flange 1406*b* to slide under the opposing overhanging ridges 1522 (e.g., 1522*ba* and 1522*bb*) of the channel 1508 formed on the rear body 1502*a*. This engagement between the side arm 1410*b* of clip 1402 and the channel 1508 of rear body 1502*a* locks the rear body 1502*a* (and its associated front body 102*a*) in place on the clip 1402. FIG. 19 is a cross-section view depicting this engagement of clip 1402 and rear body 1502.

Figure 17D:
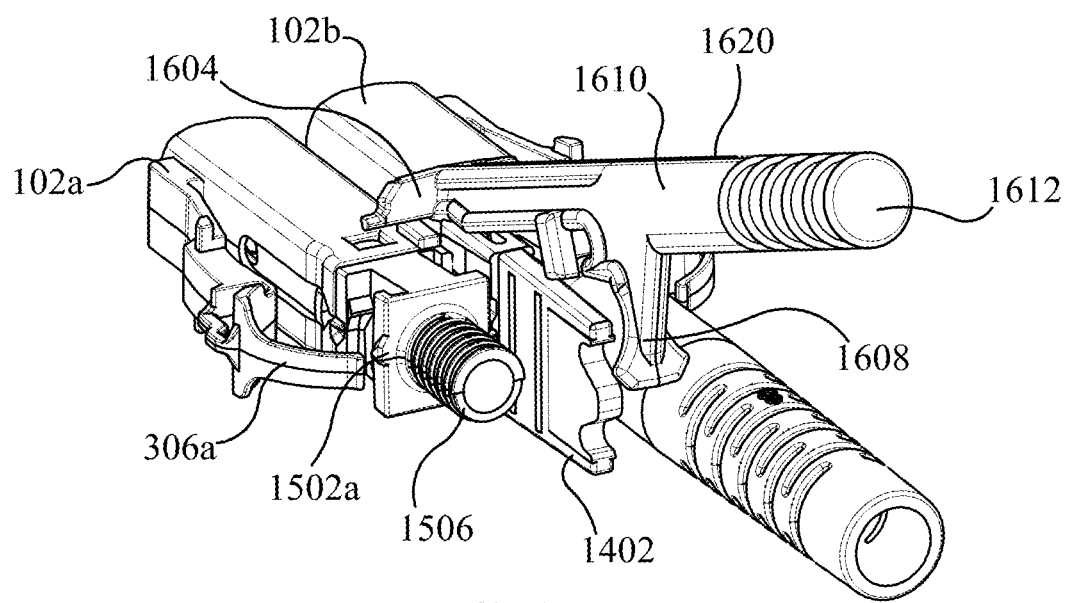
Figure 17E:
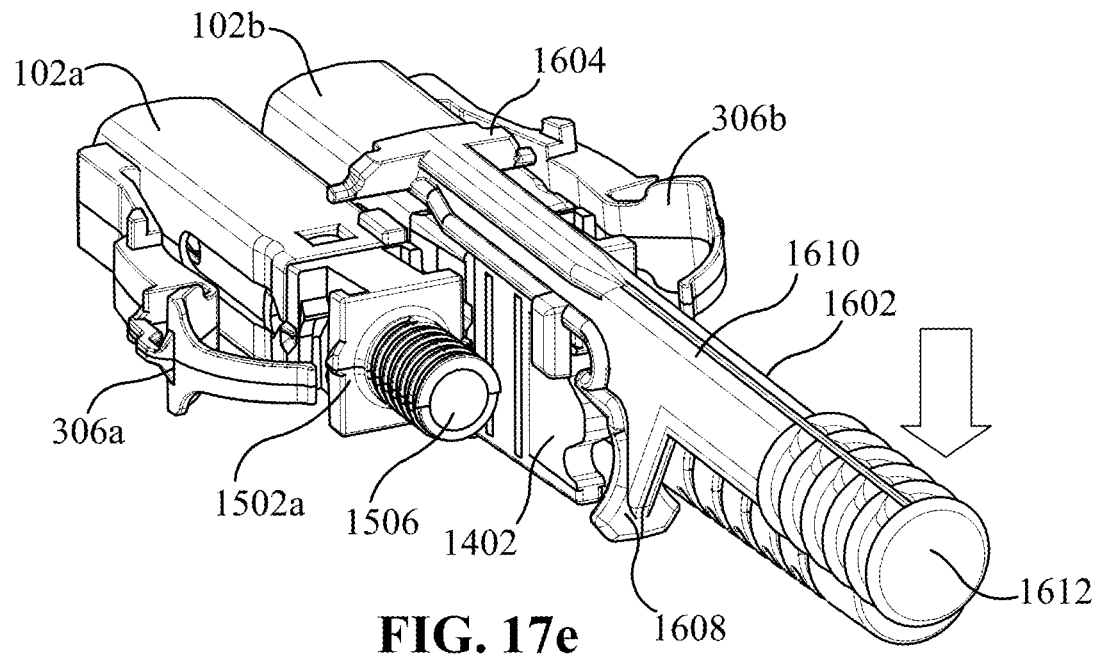
Figure 17F:
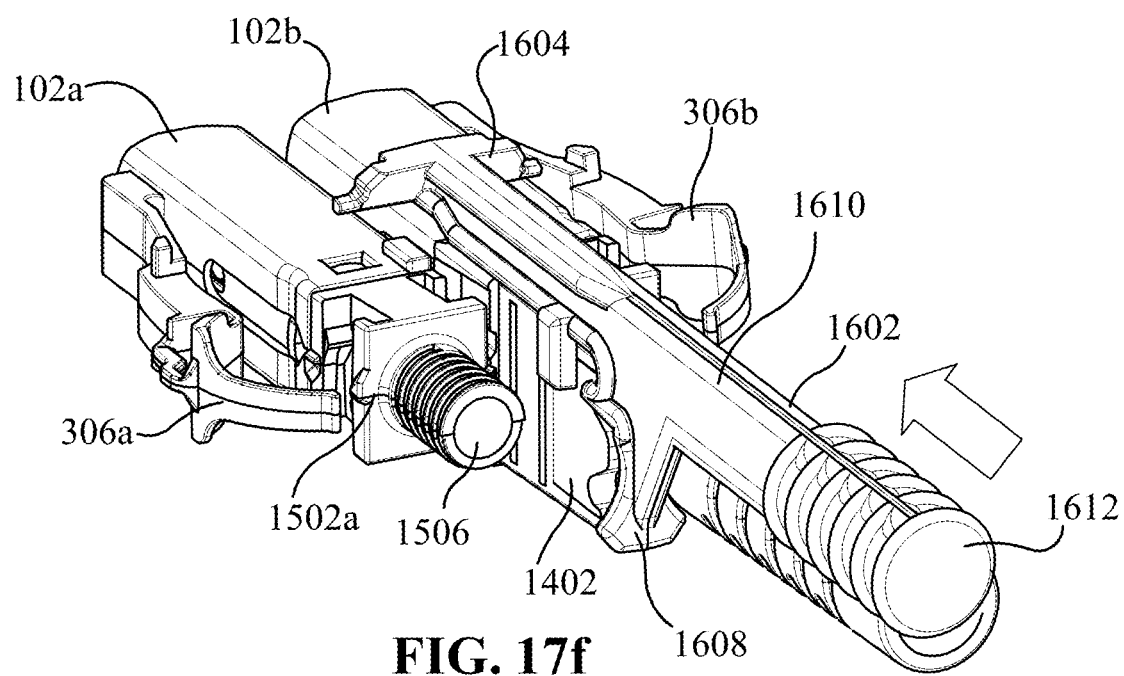

The puller 1602 can then be attached to the assembly by first inserting protrusion 1606 into groove 1404 of clip 1402 (either groove 1404*a* or 1404*b*) as shown in FIG. 17*d*, pressing down on the rear of the puller until the arm 1610 rests flat on the clip as shown in FIG. 17*e*, and sliding the puller 1602 forward until the puller's tongue 1608 abuts against the rear edge 1414 of clip 1402 as shown in FIG. 17*f*.

Figure 17G:
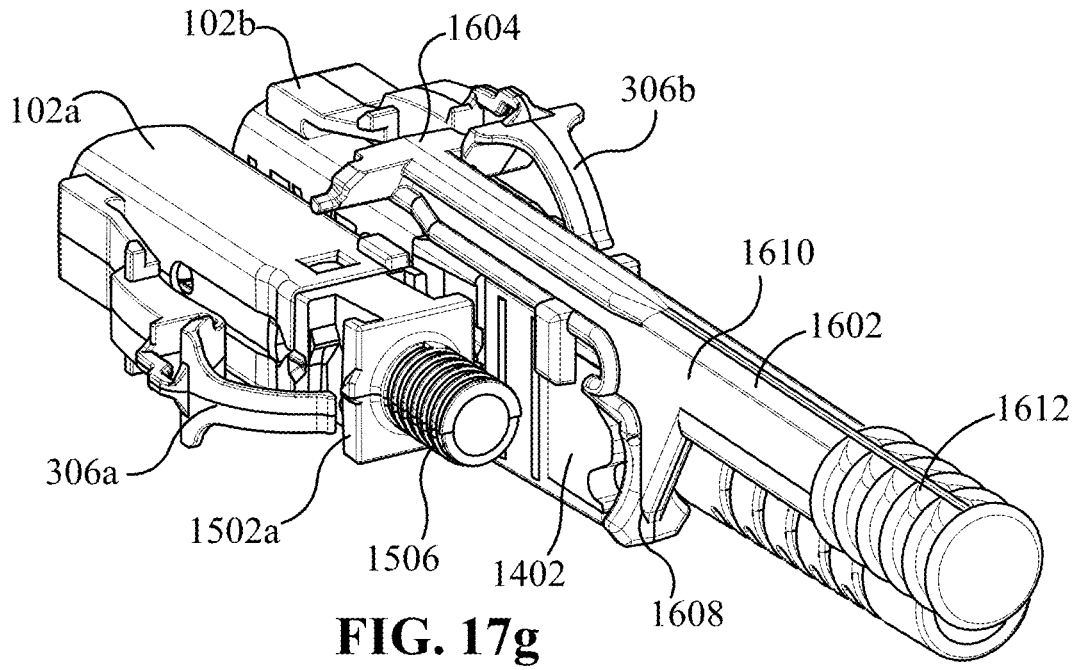
Figure 17H:
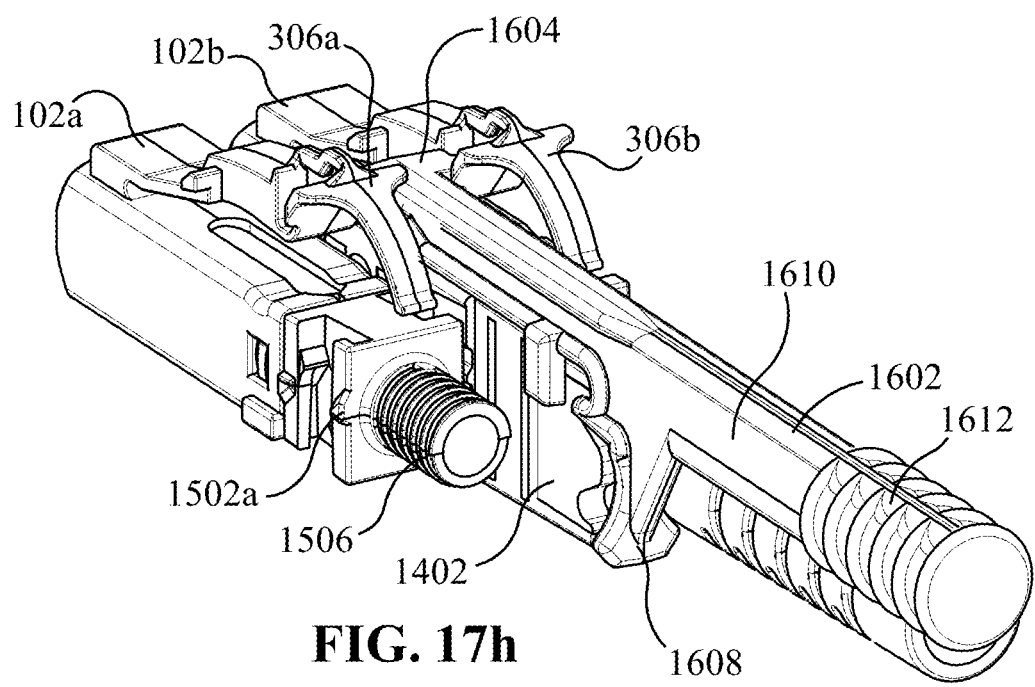
Figure 17I:
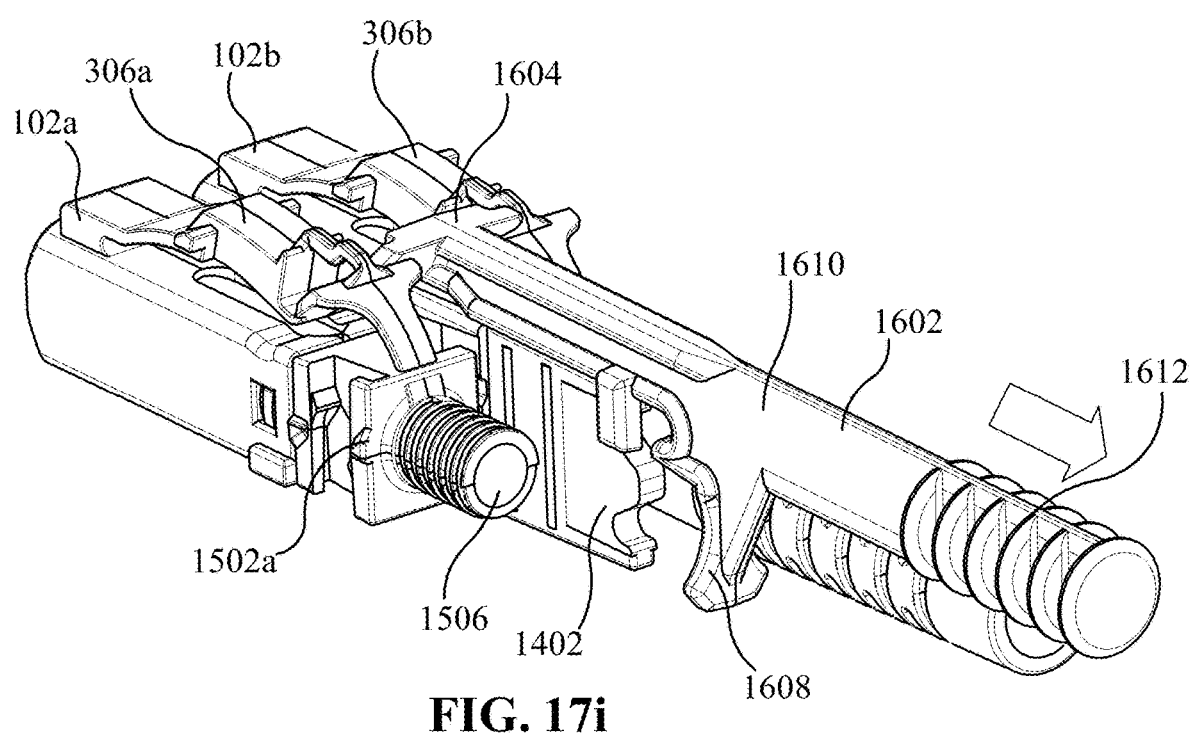

When both simplex connectors are attached to clip 1402, the two front bodies 102*a* and 102*b* are rotated about their corresponding barrel projections 1504 so that the latches 306 face upward, as shown in FIGS. 17*g* and 17*h*, respectively. While the front bodies 102*a* and 102*b* are in these positions, the t-bar 1604 of the puller 1602 rests inside the two recessed areas 312 of the latches 306*a* and 306*b* of front bodies 102. Finally, as shown in FIG. 17*i*, the puller 1602 is slid backward away from the resulting connector assembly to lock the t-bar 1604 in the recessed areas 312 of latches 306*a* and 306*b*.

Figure 20:
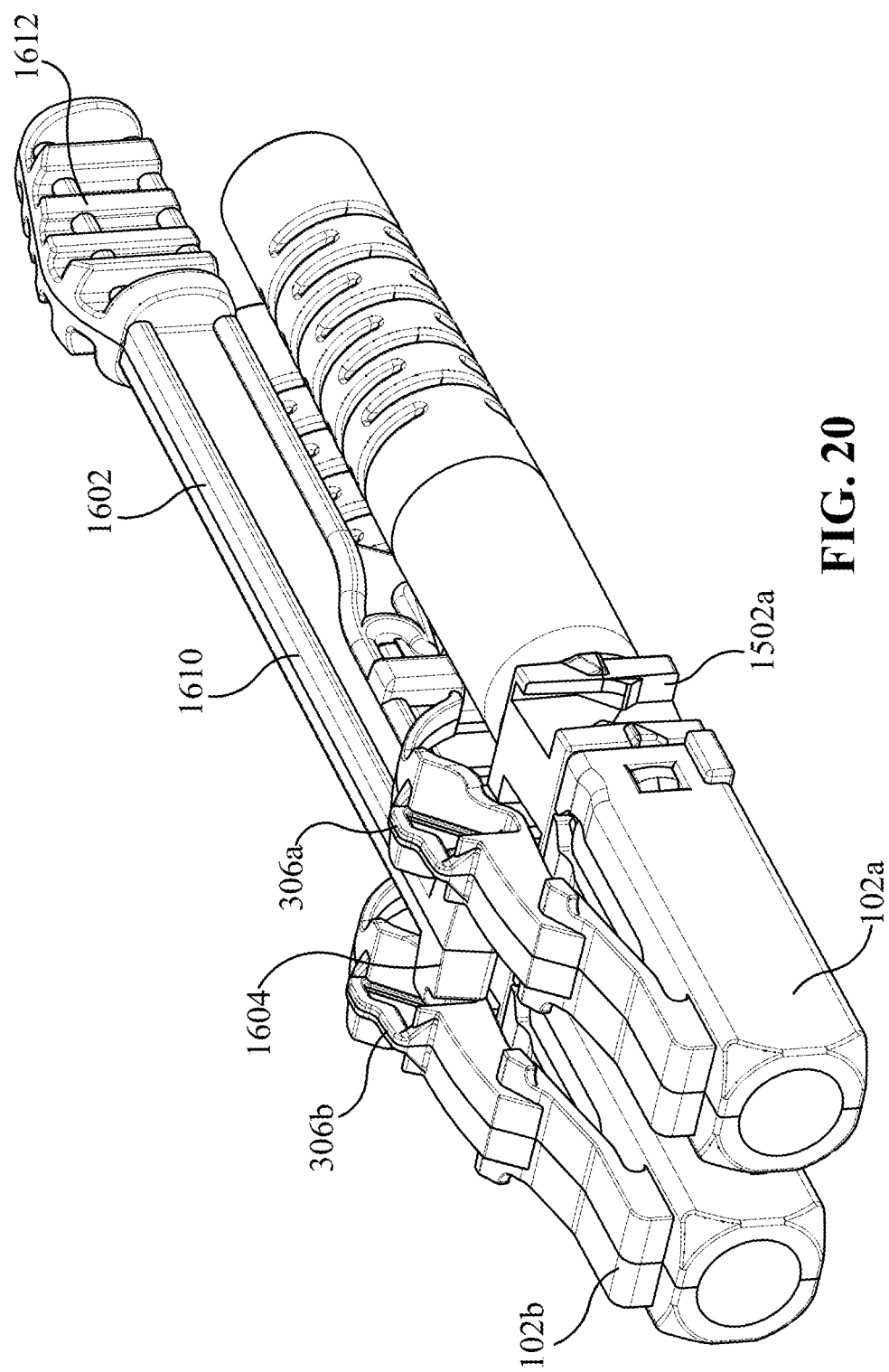
FIG. 20 is a perspective view of a paired simplex connector assembly.
Figure 21:
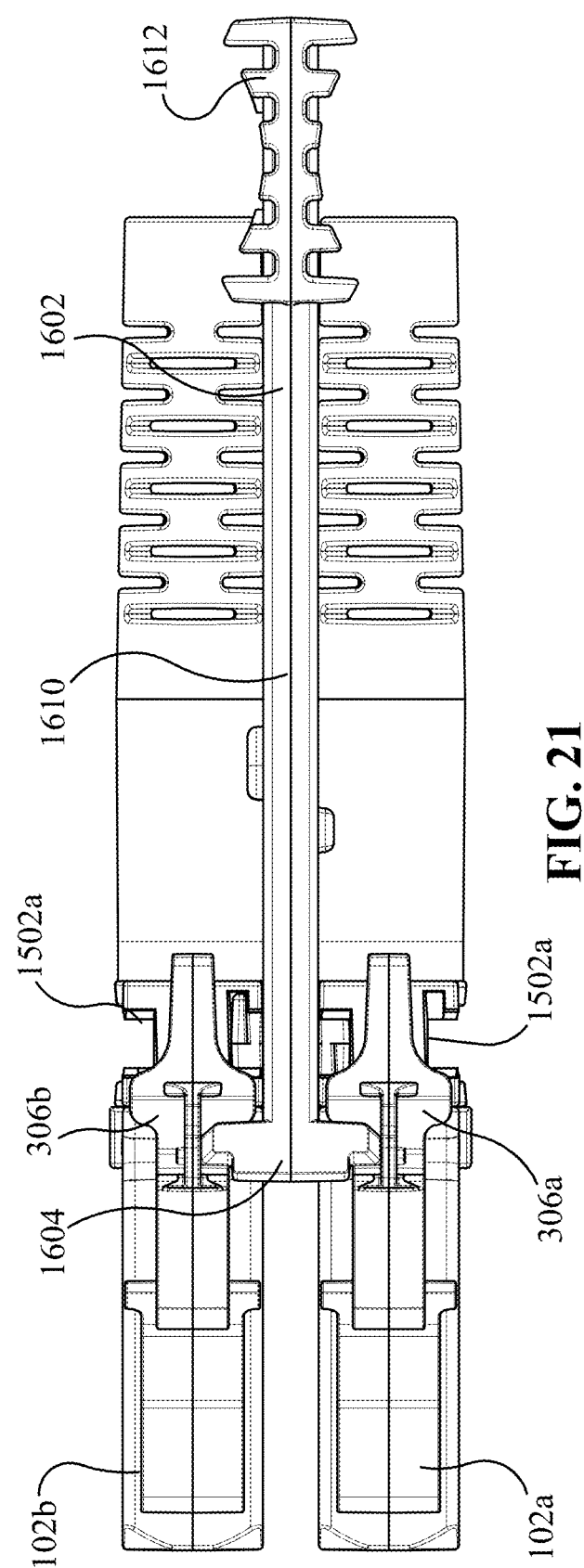
FIG. 21 is a top view of the paired simplex connector assembly.

FIG. 20 is a perspective view of the resulting paired simplex connector assembly, and FIG. 21 is a top view of the paired simplex connector assembly. Since the front bodies 102a, 102b interact with rear bodies 1502a, 1502b in the same manner as rear bodies 103, the polarity of the paired simplex connector assembly depicted in FIGS. 20 and 21 can be reversed using a sequence similar to that illustrated in FIGS. 13a-13f. However, it is to be appreciated that clip 1402 can be used to pair two simplex LC connectors having other structures that may not necessarily support the polarity reversal sequence of FIGS. 13a-13f. For example, simplex LC connectors having single-piece bodies that do not include a rotatable front body 102 can also be connected using clip 1402 to yield a paired simplex LC connector. In such embodiments, the single-piece simplex bodies may include one or more channels similar to channel 1508 capable of engaging with the flanges 1406 of side arms 1410.

Figure 22:
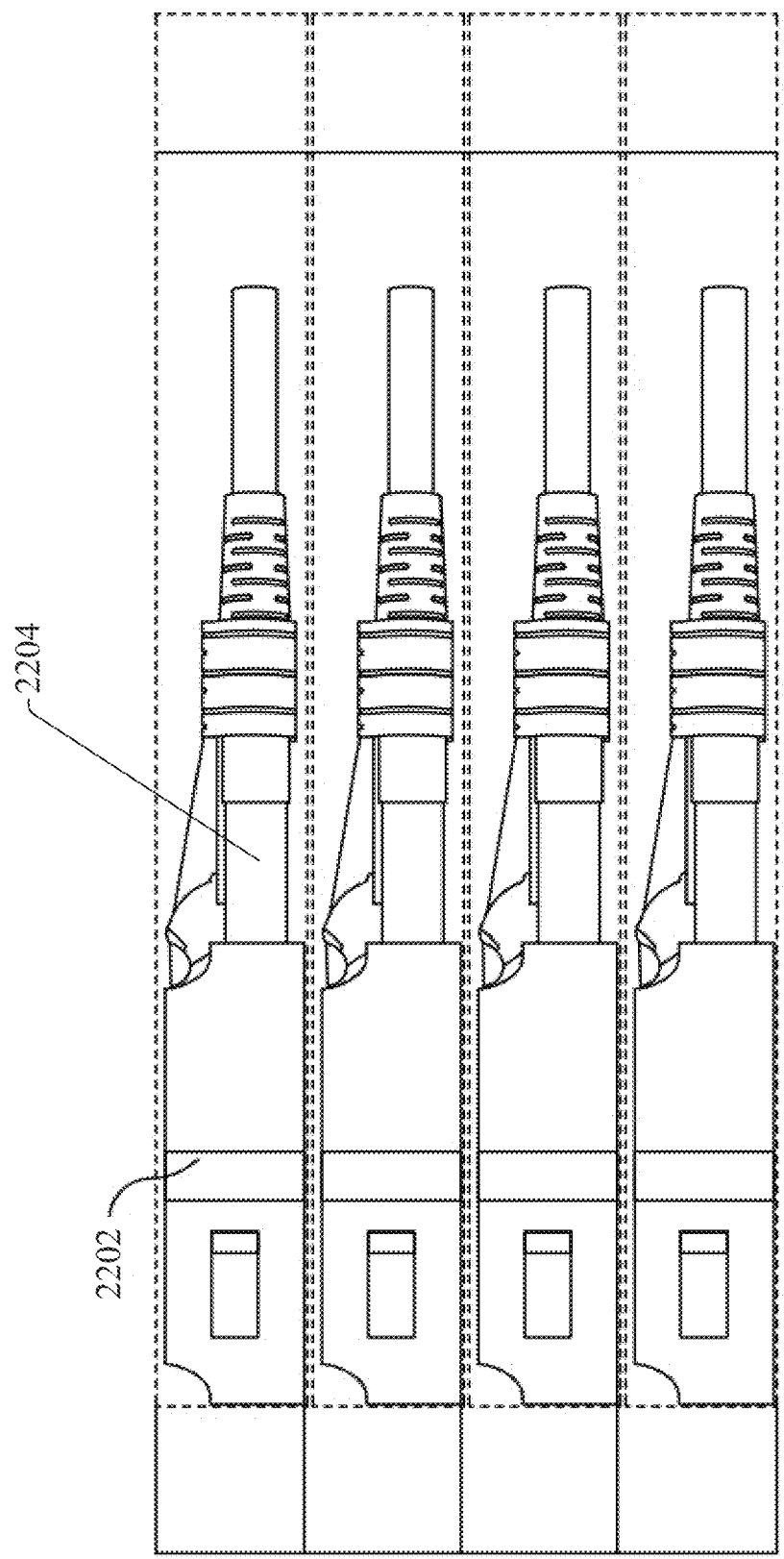
FIG. 22 is a side view of an example high density patching installation comprising a number of stacked adapters.

As can be seen in FIGS. 20 and 21 clip 1402, which provides the bridged connection for the two simplex connectors, is compact and nearly invisible when the paired simplex connector is assembled, since the clip 1402 resides exclusively between the two simplex connectors. This is in contrast to conventional wrap-around mechanisms that are typically used to join two simplex connectors to form a duplex arrangement. This also yields a relatively low vertical profile that renders the resulting connector assembly suitable for use within high density connectivity installations. FIG. 22 is a side view of an example high density connectivity installation comprising a number of stacked adapters 2202, each adapter comprising a row of duplexed data ports into which paired simplex connectors can be inserted. As illustrated by the dashed boxes, the vertical profile of the connector design described herein is low enough to remain within the profile dimensions of the adapters 2202. Their low vertical profile allows the connectors to be installed in high density connectivity applications without interference between adjacent connectors.

The paired simplex connectors described herein incorporate a number of design features that address a number of functional and perceptual issues that arise in fiber optic patching applications. For example, the relatively small number of parts required for the connector assemblies described herein can reduce manufacturing costs while providing a more rigid structure relative to connectors that incorporate a greater number of components. By enclosing the ferrule assemblies within grooved barrel structures over which the front bodies 102 can be mounted, such that the front bodies 102 can be rotated about the barrel projection without rotating the ferrule assemblies 106, the connectors described herein allow users to quickly and easily reverse the polarity of the connectors and cabling in the field (e.g., from crossed to straight-through, or vice versa) without twisting or entangling the optical fibers housed within the connectors, and without opening the connector housing. This polarity reversal feature is implemented in a connector design that also allows for installation of a puller (e.g., puller 104 or 1602) that facilitates easy access to the connector in congested connectivity environments for ease of connector insertion and removal from corresponding duplex adapters. The chamfered front edges of the front bodies 102 of the connectors can improve the ease with which the connectors are inserted into a fiber adapter, particularly in low visibility, or close, areas where precise manual alignment between the connector and a corresponding adapter is not easily achieved.

Figure 23:
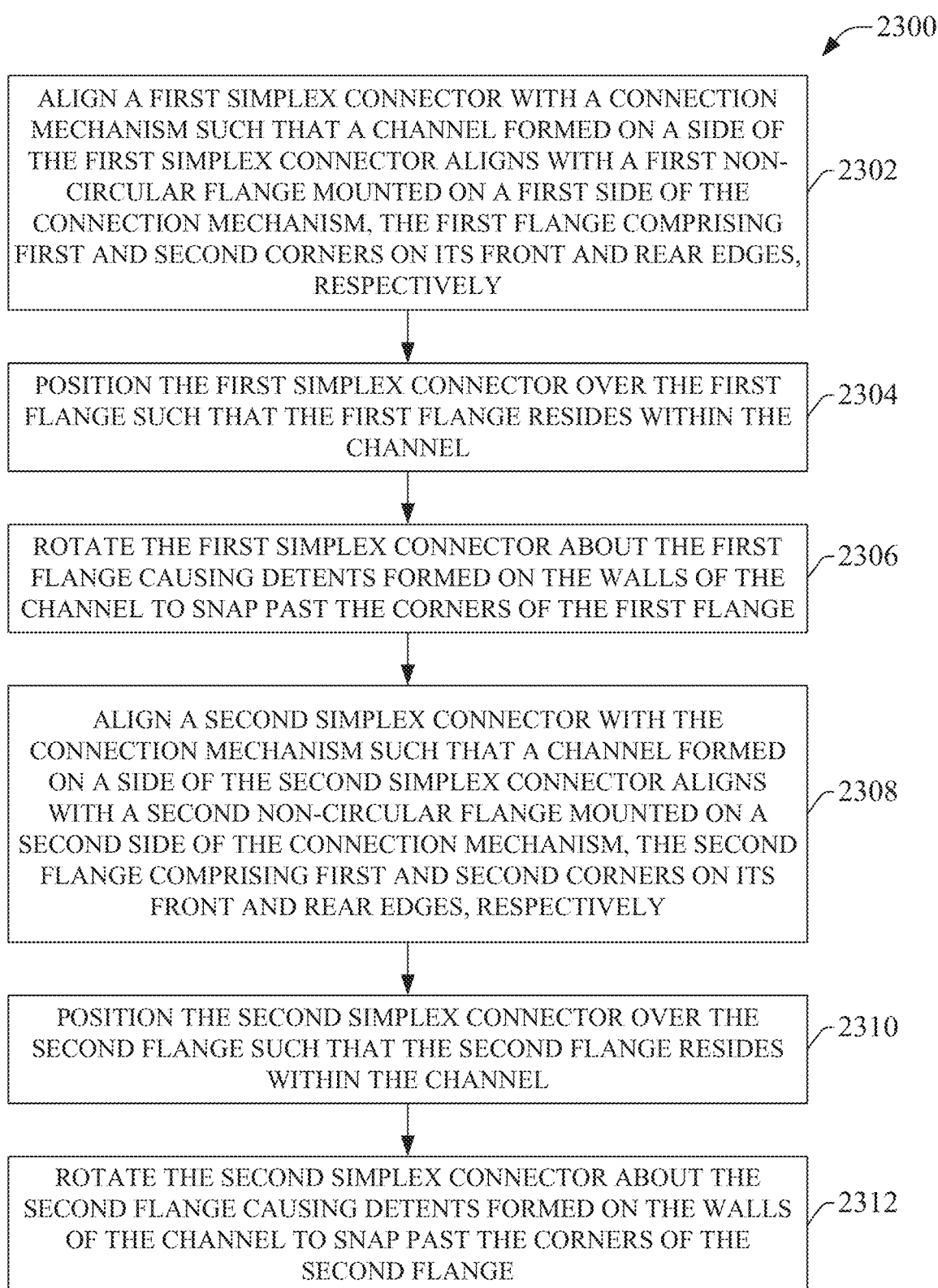
FIG. 23 is a flowchart of an example methodology for assembling a paired simplex fiber optic connector.
Figure 24A:
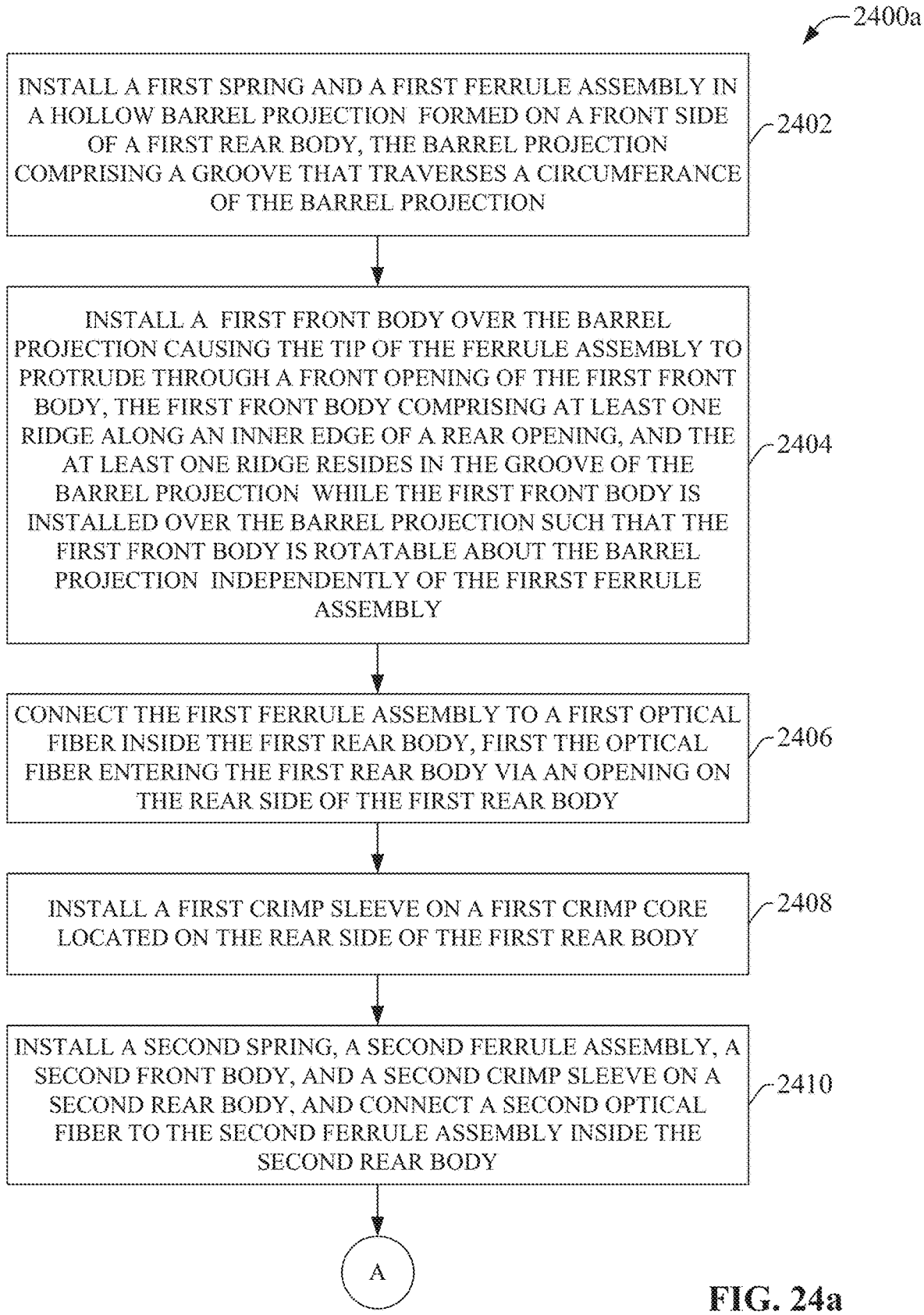
FIG. 24a is a flowchart of a first part of an example methodology for assembling a paired simplex fiber optic connector having features that facilitate polarity reversal without the need to open the connector housings.
Figure 24B:
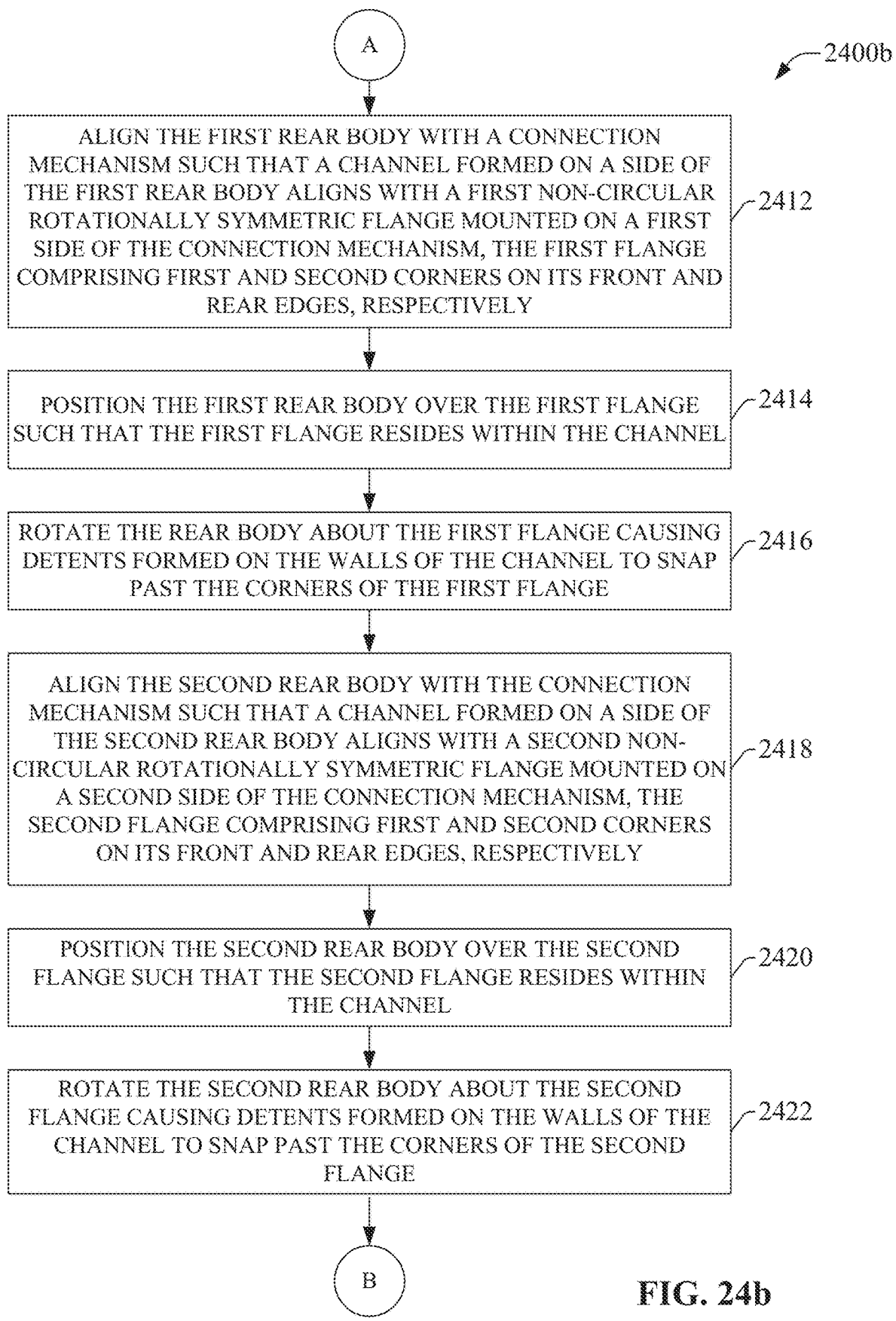
FIG. 24b is a flowchart of a second part of the example methodology for assembling a paired simplex fiber optic connector having features that facilitate polarity reversal without the need to open the connector housings.
Figure 24C:
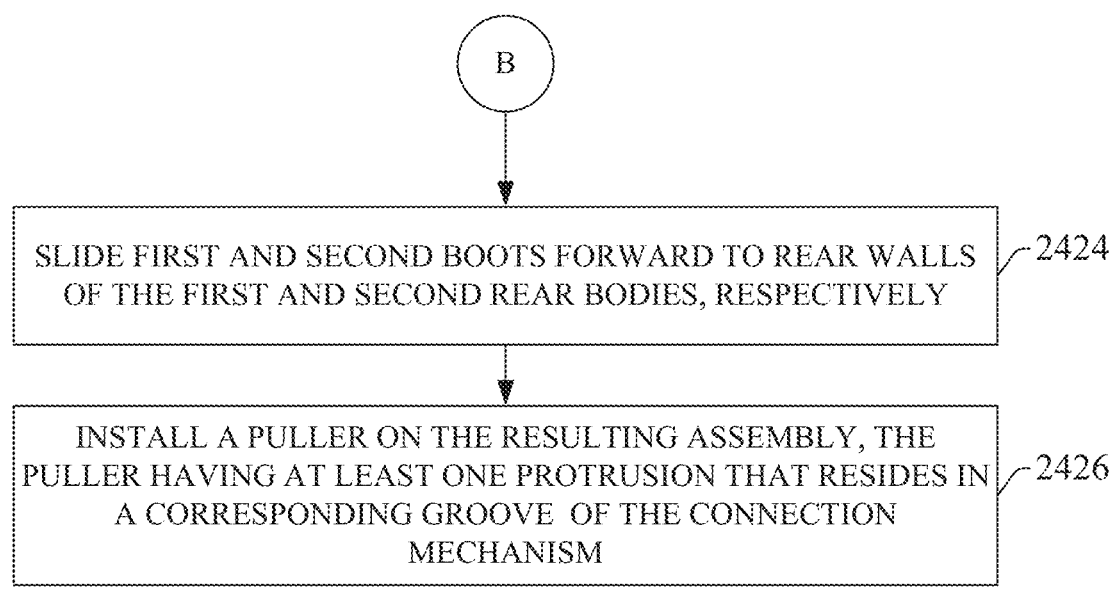
FIG. 24c is a flowchart of a third part of the example methodology for assembling a paired simplex fiber optic connector having features that facilitate polarity reversal without the need to open the connector housings.

FIGS. 23-24c illustrate various methodologies in accordance with one or more embodiments of the subject application. While, for purposes of simplicity of explanation, the one or more methodologies shown herein are described as a series of steps, it is to be understood and appreciated that the subject innovation is not limited by the order of steps, as some steps may, in accordance therewith, occur in a different order and/or concurrently with other steps from that shown and described herein. For example, those skilled in the art will understand and appreciate that a methodology could alternatively be represented as a series of interrelated states or events, such as in a state diagram. Moreover, not all illustrated steps may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 23 illustrates an example methodology 2300 for assembling a paired simplex fiber optic connector according to one or more embodiments described herein. Initially, at 2302, a first simplex connector is aligned with a connection mechanism such that a channel formed on a side of the first simplex connector aligns with a first non-circular flange mounted on a first side of the connection mechanism. The first flange comprises first and second corners on its front and rear edges, respectively, and in some embodiments may be rotationally symmetrical. In some embodiments, the simplex connector can comprise an assembly of a front body and a rear body having the designs described and illustrated herein (e.g., in connection with FIGS. 3 and 15a-15c). Alternatively, the simplex connector may be another type of simplex connector having a channel capable of receiving and engaging with the flange. Aligning the channel and the flange may involve orienting the simplex connector at a downward angle relative to a lengthwise axis of the connection mechanism, which aligns the length of the channel with the length of the flange. At 2304, the first simplex connector is positioned over the first flange such that the first flange resides within the channel. At 2306, the first simplex connector is rotated upward about the first flange, causing detents formed on the walls of the channel to snap past the corners of the first flange, thereby connecting the first simplex connector to the connection mechanism.

At step 2308, a second simplex connector is aligned with the connection mechanism such that a channel formed on a side of the second simplex connector aligns with a second non-circular flange mounted on a second side of the connection mechanism (similar to step 2302 for the first simplex connector). The second flange has a shape similar to the first flange. At 2310, the second simplex connector is positioned over the second flange such that the second flange resides within the channel (similar to step 2304 for the first simplex connector). At 2312, the second simplex connector is rotated about the second flange causing detents formed on the walls of the channel to snap past the corners of the second flange (similar to step 2306 for the first flange). At the completion of step 2312, the two simplex connectors are held substantially parallel to one another by the connection mechanism, forming a paired simplex connector assembly that can be plugged into a duplex adapter or port (e.g., a fiber optic port). In some embodiments, a puller can be attached to the assembly to render the connector more easily accessible within congested installations.

FIG. 24a is a first part 2400a of an example methodology for assembling a paired simplex fiber optic connector having features that facilitate polarity reversal without the need to open the connector housings. Initially, at step 2402, a first spring and a first ferrule assembly are installed in a hollow barrel projection formed on a front side of a first rear body, the barrel projection comprising a groove that traverses all or part of a circumference of the barrel projection. At 2404, a first front body is installed over the barrel projection, causing the front tip of the first ferrule assembly to protrude through a front opening of the first front body. The first front body comprises at least one ridge along an inner edge or rim of a rear opening, and the at least one ridge resides in the groove of the barrel projection while the first front body is installed over the barrel projection, such that the first front body is rotatable about the barrel projection independently of the first ferrule assembly.

At 2406, the first ferrule assembly is connected to a first optical fiber inside the first rear body, the first optical fiber entering the first rear body via an opening on the rear side of the first rear body. At 2408, a first crimp sleeve is installed on a first crimp core located on the rear side of the first rear body. At 2410, a second spring, a second ferrule assembly, a second front body, and a second crimp sleeve are installed on a second rear body, and a second optical fiber is connected to the second ferrule assembly inside the second rear body.

The methodology continues with the second part 2400*b* illustrated in FIG. 24*b*. At 2412, the first rear body (with first front body attached) is aligned with a connection mechanism such that a channel formed on a side of the first rear body aligns with a first non-circular flange mounted on a first side of the connection mechanism (similar to step 2302 of methodology 2300). At 2414, the first rear body is positioned over the first flange such that the first flange resides within the channel (similar to step 2304 of methodology 2300). At 2416, the first rear body is rotated upward about the first flange, causing detents formed on the walls of the channel to snap past the corners of the first flange (similar to step 2306 of methodology 2300).

At 2418, the second rear body is aligned with the connection mechanism such that a channel formed on a side of the second rear body aligns with a second non-circular, rotationally symmetric flange mounted on a second side of the connection mechanism (similar to step 2410 for the first simplex connector). At 2420, the second rear body is positioned over the second flange such that the second flange resides within the channel (similar to step 2412 for the first simplex connector). At 2422, the second rear body is rotated about the second flange causing detents formed on the walls of the channel to snap past the corners of the second flange (similar to step 2414 for the first flange). At the completion of step 2422, the two simplex connectors are held substantially parallel to one another by the connection mechanism, forming a paired simplex connector assembly that can be plugged into a duplex port (e.g., a fiber optic port).

The methodology continues with the third part 2400*c* illustrated in FIG. 24*c*. At 2424, first and second boots are slid forward to rear walls of the first and second rear bodies, respectively. At 2426, a puller is installed on the assembly that results from implementing steps 2402-2424, the puller having at least one protrusion that resides in a corresponding groove of the connection mechanism.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method for assembling a paired simplex connector, comprising:
    fitting a first simplex connector over a first side arm formed on a first side of a clip, wherein the fitting the first simplex connector comprises orienting the first simplex connector at a first angle that allows a first flange formed on the first side arm to fit inside a first channel formed on the first simplex connector;
    rotating the first simplex connector about the first flange to a second angle, wherein the rotating the first simplex connector causes the first channel to engage with the first flange;
    fitting a second simplex connector over a second side arm formed on a second side of the clip, wherein the fitting the second simplex connector comprises orienting the second simplex connector at the first angle that allows a second flange formed on the second side arm to fit inside a second channel formed on the second simplex connector; and
    rotating the second simplex connector about the second flange to the second angle, wherein the rotating the second simplex connector causes the second channel to engage with the second flange,
    wherein, while the first simplex connector is engaged with the first side arm and the second simplex connector is engaged with the second side arm, the first simplex connector is held substantially parallel to the second simplex connector.

2. The method of claim 1, wherein
    the rotating the first simplex connector causes a first detent on a first wall of the first channel and a second detent on a second wall of the first channel to engage with respective first corners formed on the first flange, and the rotating the second simplex connector causes a third detent on a third wall of the second channel and a fourth detent on a fourth wall of the second channel to engage with respective second corners formed on the second flange.

3. The method of claim 1, further comprising attaching a puller to the clip, wherein the puller comprises a t-bar formed on an end of an arm and a protrusion formed below the t-bar, and the attaching comprises inserting the protrusion into a groove formed on an edge of the clip.

4. The method of claim 3, wherein the first simplex connector comprises a first latch having a first recessed area and the second simplex connector comprises a second latch having a second recessed area, and the attaching the puller comprises inserting the t-bar into the first recessed area and the second recessed area.

5. The method of claim 1, wherein the rotating the first simplex connector causes an edge of the first flange to engage with a first overhanging ridge formed along a first wall of the first channel, and the rotating the second simplex connector causes an edge of the second flange to engage with a second overhanging ridge formed along a second wall of the second channel.

6. The method of claim 1, further comprising assembling the first simplex connector, wherein the assembling comprises:

inserting a spring and a ferrule assembly into a hollow barrel projection of a connector rear body; and fitting a connector front body over the barrel projection of the connector rear body.

7. The method of claim 6, wherein the barrel projection comprises a groove at or near a base of the barrel projection, and at least a portion of a rim of a rear opening of the connector front body comprises a ridge, and the fitting comprises fitting the connector front body over the barrel projection resulting in the ridge residing in the groove of the barrel projection.

8. A paired simplex connector, comprising:

a first simplex connector; and a second simplex connector, wherein the first simplex connector and the second simplex connector are held in a duplex formation by a clip, a first flange formed on a first side of the clip is configured to fit into a first channel formed on a side of the first simplex connector, and the first simplex connector attaches to the first flange in response to a rotation of the first simplex connector about the first flange, and a second flange formed on a second side of the clip is configured to fit into a second channel formed on a side of the second simplex connector, and the second simplex connector attaches to the second flange in response to a rotation of the second simplex connector about the second flange.

9. The paired simplex connector of claim 8, wherein a first corner is formed on a front edge of the first flange, and a second corner is formed on a rear edge of the first flange, a first detent is formed on a first wall of the first channel, and a second detent is formed on a second wall of the first channel, and the first detent and the second detent are configured to engage with the first corner and the second corner, respectively, in response to the rotation of the first simplex connector about the first flange.

10. The paired simplex connector of claim 9, wherein at least one of the first flange or the second flange is non-circular and rotationally symmetrical, and has a first lengthwise axis that is angled relative to a second lengthwise axis of the clip.

11. The paired simplex connector of claim 8, wherein at least one of the first simplex connector or the second simplex connector comprises:

a rear body comprising a barrel projection on a front side of the rear body, wherein the barrel projection is hollow and is configured to receive a spring and a ferrule assembly via a front end of the barrel projection, and wherein the barrel projection comprises a groove at or near a base of the barrel projection; and a front body configured to fit over the barrel projection while the spring and the ferrule assembly are in the barrel projection, the front body comprising a rear opening that receives the barrel projection, wherein at least a portion of a rim of the rear opening comprises a ridge that resides in the groove of the barrel projection while the front body is attached to the barrel projection.

12. The paired simplex connector of claim 11, wherein the front body is configured to rotate about the barrel projection independently of the ferrule assembly while the front body is attached to the barrel projection.

13. The paired simplex connector of claim 8, wherein the first flange is formed on a first end of a first side arm formed on the first side of the clip, and the second flange is formed on a second end of a second side arm formed on the second side of the clip.

14. The paired simplex connector of claim 8, further comprising a puller comprising a t-bar formed on an end of an arm and a protrusion formed below the t-bar, wherein the protrusion is configured to reside in a groove formed on the clip.

15. The paired simplex connector of claim 14, wherein the first simplex connector comprises a first latch and the second simplex connector comprise a second latch, and the t-bar is configured to reside in a first recessed area and a second recessed area formed on the first latch and the second latch, respectively.

16. The paired simplex connector of claim 8, wherein the clip is symmetrical about a lengthwise axis.

17. The paired simplex connector of claim 8, wherein a first overhanging ridge is formed along a first wall of the first channel and is configured to engage with a first edge of the first flange, and a second overhanging ridge is formed along a second wall of the second channel and is configured to engage with a second edge of the second flange.

18. A system, comprising:

a first simplex connector that fits over a first flange on a first side of a clip while at a first angle relative to the clip, and that attaches to the first flange in response to being rotated about the first flange to a second angle while fitted over the first flange;

a second simplex connector that fits over a second flange on a second side of the clip while at the first angle relative to the clip, and that attaches to the second flange in response to being rotated about the second flange to the second angle while fitted over the second flange, wherein the clip holds the first simplex connector and the second simplex connector parallel or substantially parallel to one another while the first simplex connector and the second simplex connector are attached to the first flange and the second flange, respectively.

19. The system of claim 18, wherein the first flange fits inside a first channel formed on the first simplex connector while the first simplex connector fits over the first flange, the second flange fits inside a second channel formed on the second simplex connector while the second simplex connector fits over the second flange, rotation of the first simplex connector about the first flange from the first angle to the second angle causes a first detent on a first wall of the first channel and a second detent on a second wall of the first channel to engage with respective first corners formed on the first flange, and rotation of the second simplex connector about the second flange from the first angle to the second angle causes a third detent on a third wall of the second channel and a fourth detent on a fourth wall of the second channel to engage with respective second corners formed on the second flange.

20. The system of claim 18, further comprising a puller that attaches to the clip, wherein the puller comprises a t-bar formed on an end of an arm and a protrusion formed below the t-bar that inserts into a groove formed on the clip.

\* \* \* \* \*